United States Patent
Baisley

(10) Patent No.: US 6,711,734 B1
(45) Date of Patent: Mar. 23, 2004

(54) METHOD FOR TRANSLATING MOF METAMODELS TO UML MODELS

(75) Inventor: Donald Edward Baisley, Laguna Hills, CA (US)

(73) Assignee: Unisys Corporation, Blue Bell, PA (US)

( * ) Notice: Subject to any disclaimer, the term of this patent is extended or adjusted under 35 U.S.C. 154(b) by 369 days.

(21) Appl. No.: 09/605,204

(22) Filed: Jun. 27, 2000

(51) Int. Cl.[7] ................................................. G06F 9/44
(52) U.S. Cl. ......................................................... 717/104
(58) Field of Search ........................ 717/104, 107–108, 717/116, 117, 136, 147, 158

(56) References Cited

U.S. PATENT DOCUMENTS

| | | | |
|---|---|---|---|
| 5,596,746 A | * | 1/1997 | Shen et al. .................. 707/101 |
| 5,787,437 A | * | 7/1998 | Potterveld et al. ...... 707/103 R |
| 6,253,366 B1 | * | 6/2001 | Mutschler, III ............. 717/104 |
| 6,292,932 B1 | * | 9/2001 | Baisley et al. ............... 717/114 |
| 6,343,265 B1 | * | 1/2002 | Glebov et al. ................ 703/25 |

OTHER PUBLICATIONS

Juergen Boldt, "Complete MOF 1.3 Specification", Apr. 3, 2000, OMG.ORG, MOF 1.3, http://www.omg.org/cgi.bin/doc?formal/00–04–03.*

Juergen Boldt, "Unified Modeling Language(UML) 1.3 Specification", Mar. 1, 2000, UML 1.3, http://www.omg.org/cgi–bin/doc?formal/00–03–01.*

Atkinson, Colin, "Supporting and Applying the UML Conceptual Framework"; "The Unified Language, {UML}'98—Beyond the Notation. First International Workshop, Mulhouse, France, Jun. 1998, Selected Papers", vol. 1618,.*

* cited by examiner

Primary Examiner—Kakali Chaki
Assistant Examiner—Tuan A Vu
(74) Attorney, Agent, or Firm—Phuong-Quan Hoang; Mark T. Starr; Lise A. Rode

(57) ABSTRACT

A computer-implemented method for translating a MOF metamodel into a UML Model. The method comprises the steps of reading each element of the MOF metamodel and determining the type of each MOF element read in the preceding step. After this, a translation process is selected for the type determined in the preceding step; and, the process selected in the preceding step is executed.

22 Claims, 23 Drawing Sheets

METHOD FOR TRANSLATING MOF METAMODELS TO UML MODELS

A portion of the disclosure of this patent document contains material that is subject to copyright protection. The copyright owner has no objection to the facsimile reproduction by anyone of the patent disclosure, as it appears in the Patent and Trademark office patent files or records, but otherwise reserves all copyright rights whatsoever.

FIELD OF THE INVENTION

The present invention generally relates to object-oriented programming and in particular to a computer-implemented method for translating metamodel elements defined using a Metaobject Facility (MOF) into elements expressed using the Unified Modeling Language (UML).

BACKGROUND OF THE INVENTION

MOF metamodels are used to define metadata structures for a variety of application domains such as software modeling, data warehousing, component management, versioning, and so on. MOF defines the semantics and content structure of metamodels, but it does not define a way to graphically view a metamodel. On the other hand, UML provides a graphical language for displaying models. A metamodel is a special case of a model, so a metamodel can be viewed as a UML model. Hence there is a need for an automated method for creating a UML model from a MOF metamodel such that the UML model provides a graphical picture of the MOF metamodel.

UML provides a well-known modeling language supported by an ever-growing set of tools. Naturally, UML may be used to view metamodels. There is a need for a set of rules for making such a transformation from MOF to UML. There are two major challenges to creating a UML model from a MOF metamodel:

1) MOF has concepts, such as Reference, that are not supported by UML, yet these concepts need to be captured in a UML model so that complete metamodels can be viewed;
2) UML has much more diverse uses than metamodeling, so rules are needed that confine translation of a metamodel into UML to use appropriate UML concepts.

Therefore, there is a need for a method for creating a UML model from a MOF metamodel that captures all MOF concepts for display using appropriate UML constructs.

A co-pending patent application, Ser. No. 09/322,137 provides a method for converting a UML model to a MOF metamodel, but this method does not teach a reverse translation. For example, said method does not address MOF Import objects.

Also, said method fails to teach a way to adequately represent References in UML. If a reference is only implied by a navigational association end (as in the method disclosed in this co-pending application) then there is no way to show a navigable association end without a reference. But MOF allows for a navigable association end to exist without a reference. Further, MOF allows multiple references to be defined for a single association end. Hence, there is a need for rules for translating a MOF metamodel to UML that allow for the full flexibility of MOF with respect to References.

The method disclosed in the co-pending application also fails to imply a means for converting a MOF Constant to UML. A MOF metamodel can contain Constant objects, and a proper UML rendering of a metamodel must show its Constants. There is therefore a need for a method to translate MOF Constants for viewing in UML.

SUMMARY OF THE INVENTION

It is an object of the present invention to provide a reliable system and method that automatically converts a MOP metamodel to a UML model.

Another object of the present invention is to provide a set of rules for making a transformation from a MOF metamodel to a UML model.

Yet another object of the present invention is to provide a system and method that presents an entire metamodel in UML including each Reference, Import, and Constant.

Still another object of the present invention is to provide a system and method that provides predictable mapping from an original MOF metamodel to a UML model. This is possible because a UML model can contain Tagged Values that can contain MOF information not directly supported by UML.

These and other objects, which will become apparent as the invention is described in detail below, are provided by a computer-implemented method for translating a MOF metamodel into a UML Model. The method comprises the steps of reading each element of the MOF metamodel and determining the type of each MOF element read in the preceding step. After this, a translation process is selected for the type determined in the preceding step; and, the process selected in the preceding step is executed.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

The prefix "meta" as used herein shall describe a relationship. For example, "metadata" describes data. In a similar fashion, a metaobject is an object that represents "metadata"; and, "metamodel" means a model that defines an abstract language for expressing other models. A "meta-metamodel" means a model that defines an abstract language for expressing metamodels. The relationship between a meta-metamodel and a metamodel is analogous to the relationship between a metamodel and a model. The term model is generally used herein to denote a description of something in the real world. The concept of a model is highly fluid, and depends upon one's point of view. For example, where one is building an entire system, a model may include all of the metadata for the system. On the other hand, others are only concerned with certain components (e.g. programs A and B) or certain kinds of detail (e.g. wiring diagrams) of the system.

Figure 1:
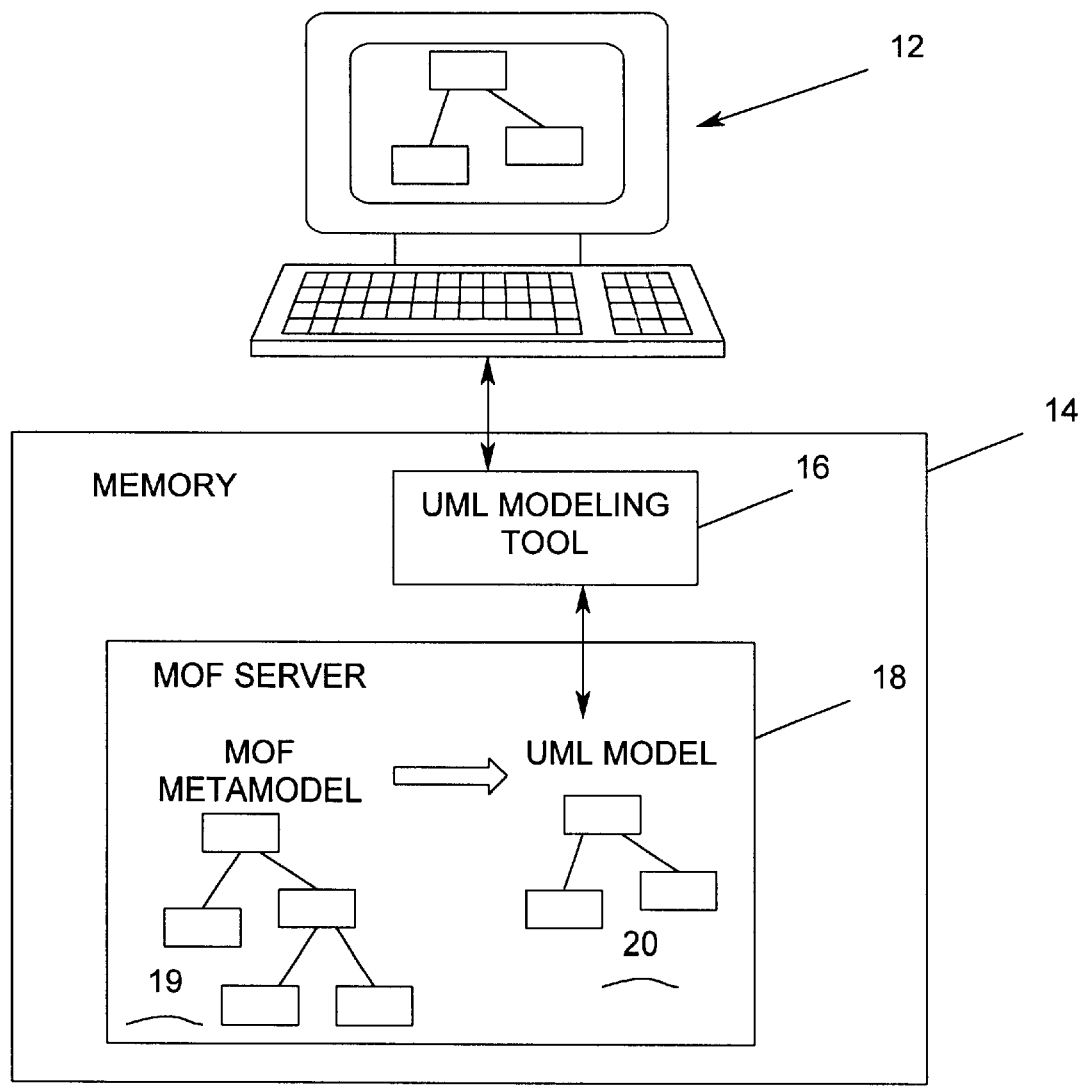
FIG. 1 is a block diagram of a computer system that may employ the method of the present invention.

Referring now to the drawings and FIG. 1 in particular, a block diagram of a computer system which may implement the method of the present invention is shown. A computer 12, such as a PC, includes a memory 14 for storing such things as a UML Modeling Tool 16. A MOF Server 18 may also be stored in the memory 14 and executed by the computer 12. Within the MOF Server a MOF metamodel 19 is stored. By use of the present invention the MOF metamodel is translated to a UML model 20 for display by the UML Modeling Tool 16.

Figure 2:
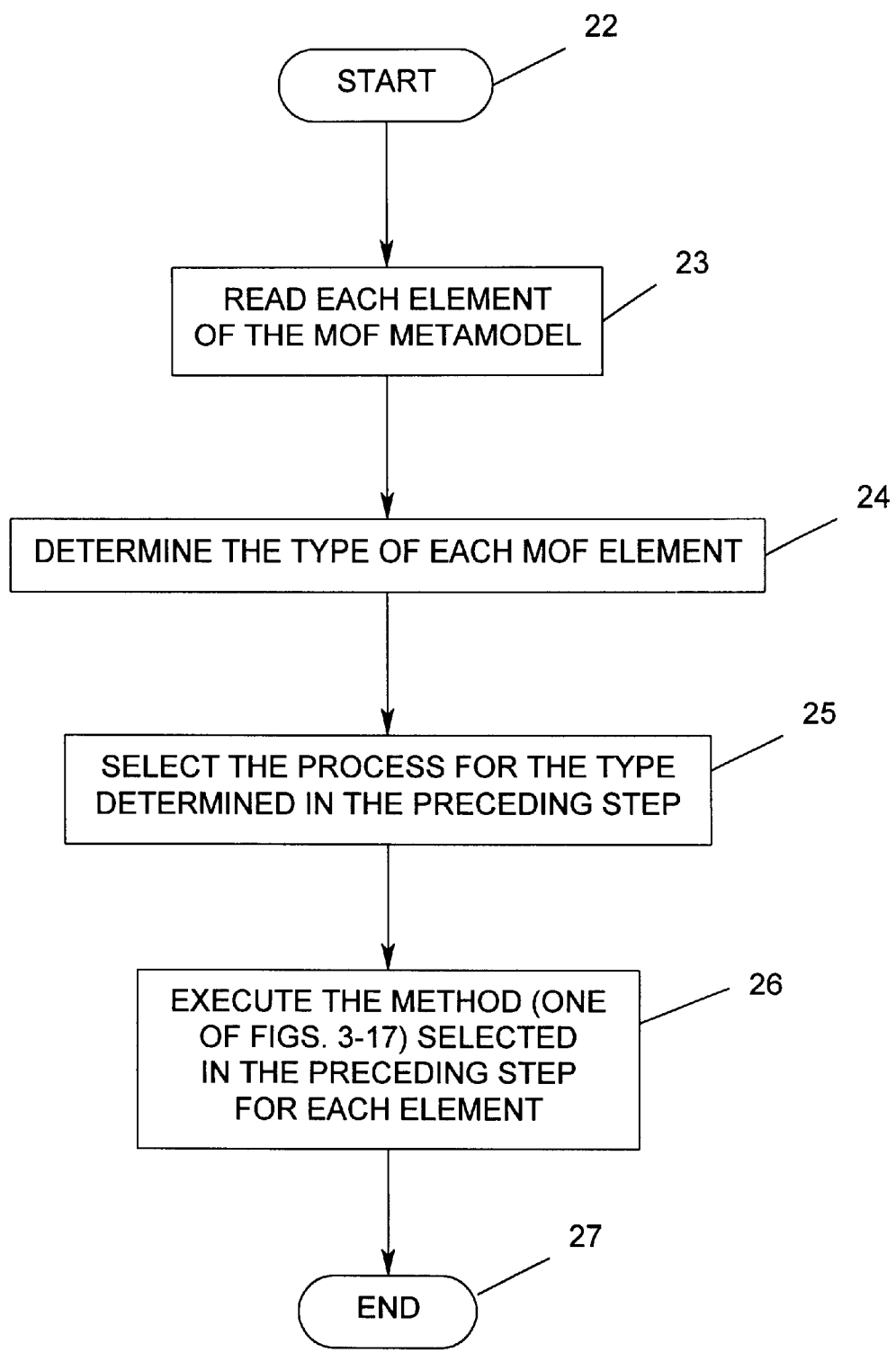
FIG. 2 is an overall flow chart of the method of the present invention.

Referring now to FIG. 2, a flow chart of the overall process of the present invention is shown. The process begins with a start bubble 22, followed by a step of reading each element of the MOF metamodel 19 (block 23). Next, a determination is made of the type of each MOF element within the metamodel (block 24) and a process is selected for the type determined in the preceding step (block 25). After this, the process selected is executed for each element (block 26) and the process ends (bubble 27).

Figure 3:
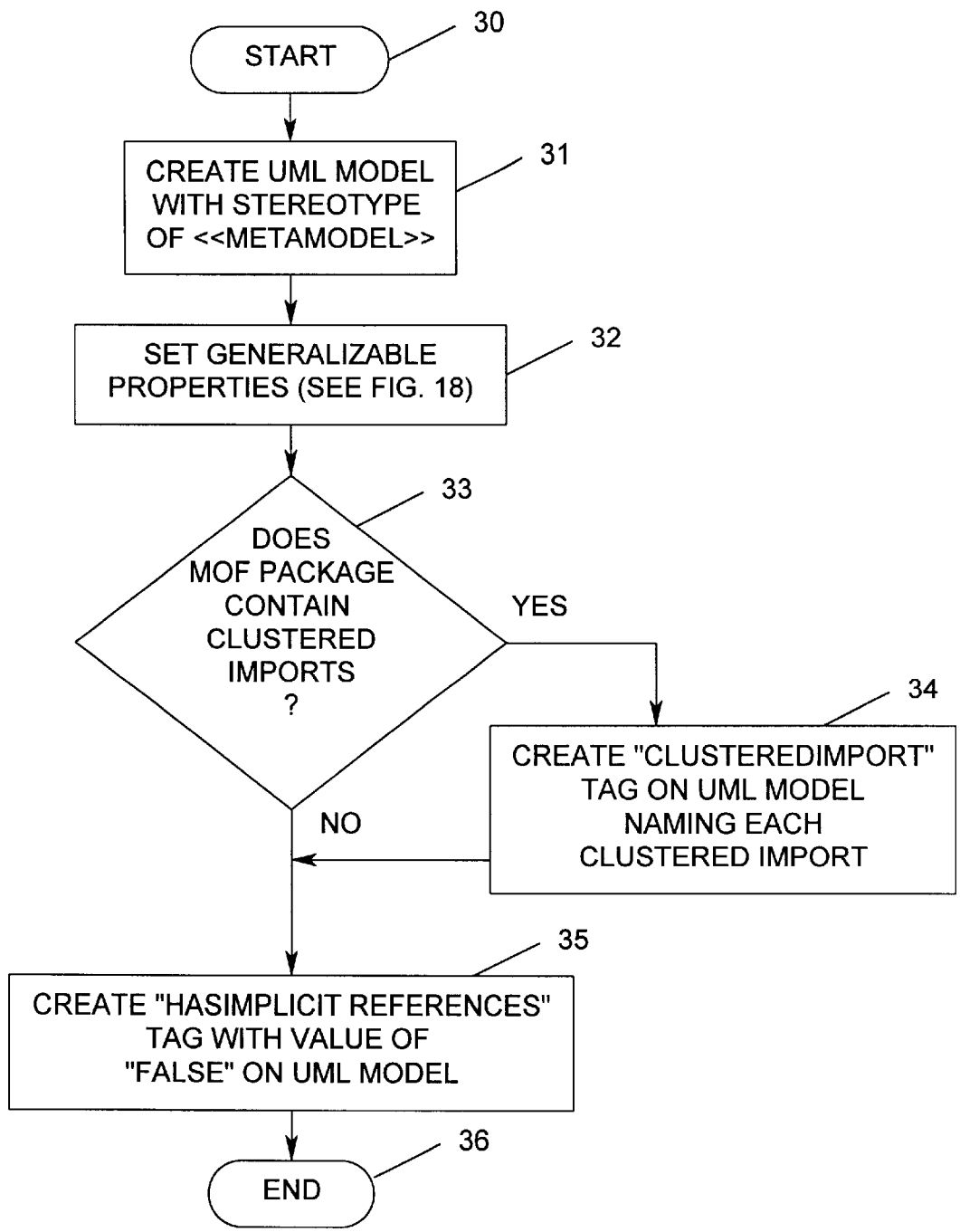
FIG. 3 is flow chart of the process for translating a MOF package into a UML model.
Figure 18:
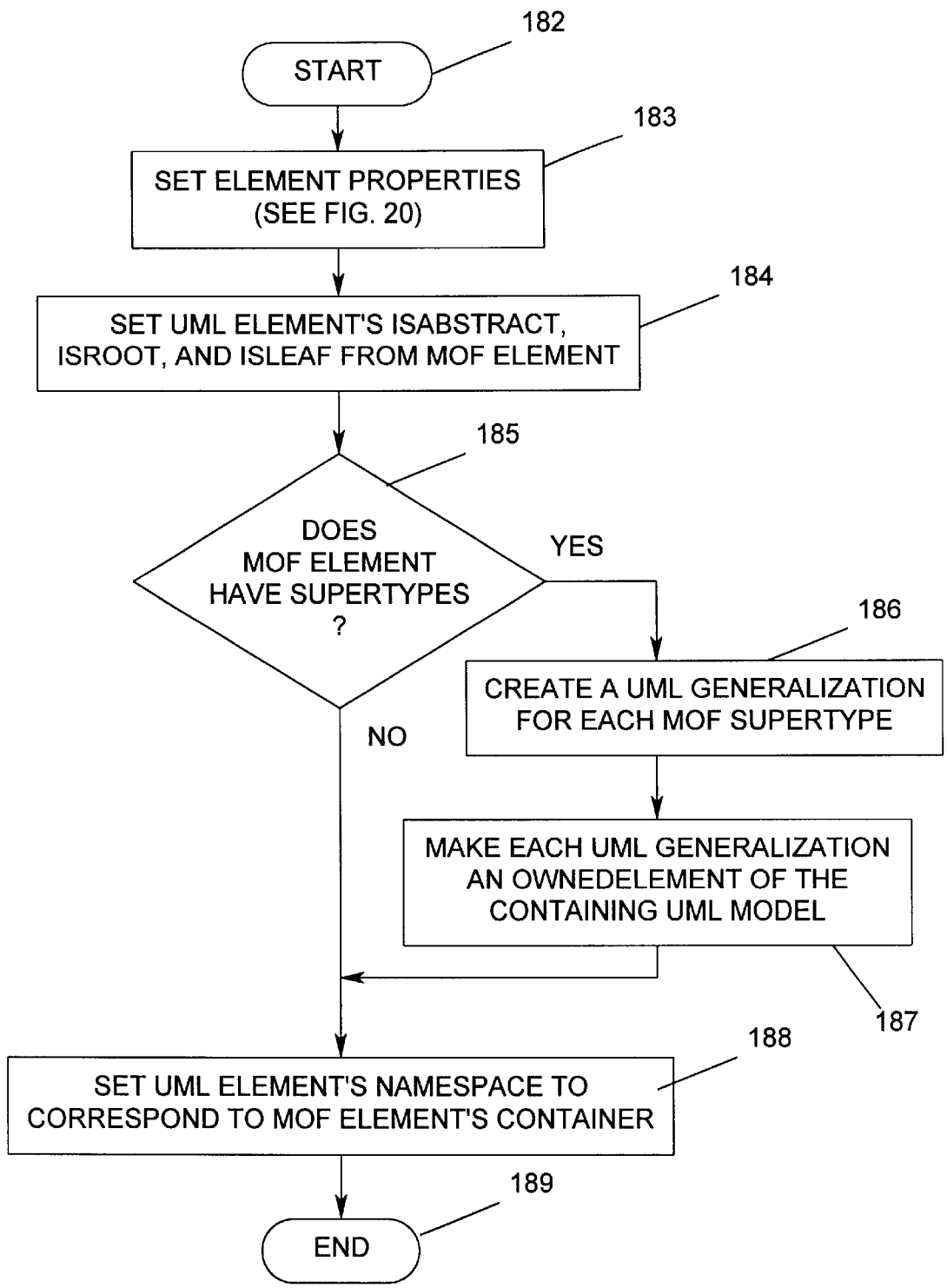
FIG. 18 is a flow chart of the process for setting generalizable properties.

Referring now to FIG. 3, the process for translating a MOF Package into a UML Model is shown. The process begins with a start bubble 30 followed by a step of creating a UML Model with a stereotype of <<metamodel>> (block 31). Next, generalizable properties are set (block 32), which process is illustrated in FIG. 18 and amplified hereinbelow. After this, a determination is made as to whether or not the MOF Package contains clustered imports (diamond 33). If the answer to this inquiry is yes, then a "clusteredImport" Tagged Value is created on the UML Model naming each clustered import (block 34). On the other hand, if the answer to the inquiry depicted by the diamond 33 is no, or upon completion of the step depicted by the block 34, a "hasImplicitReferences" Tagged Value is created with a value of FALSE on the UML model (block 35), and then the process ends (bubble 36).

Figure 4:
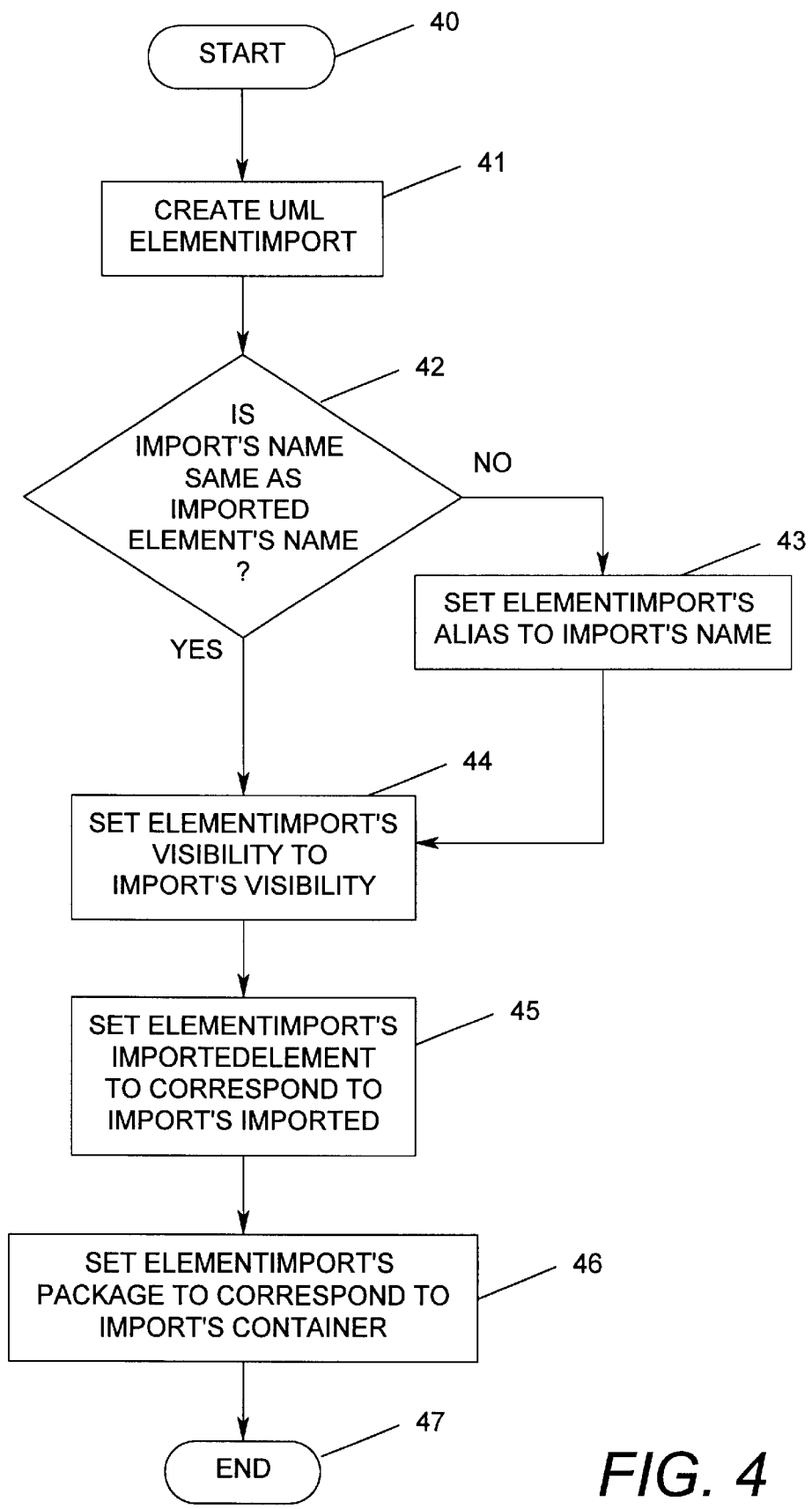
FIG. 4 is a flow chart of the process for translating a MOF Import to a UML Element Import.

Referring now to FIG. 4, a flow chart of the process for translating a MOF Import into a UML Element Import is shown. The process begins with a start bubble 40 followed by a step of creating a UML Element Import (block 41). Next, an inquiry is made as to whether or not the Import's name is the same as the imported element's name (diamond 42). If the answer to this inquiry is no, then the Element Import's alias is set to Import's name (block 43). On the other hand, if the answer to this inquiry is yes, or upon completion of the step depicted by the block 43, the Element Import's visibility is set to the Import's visibility (block 44). After this, the Element Import's imported element is set to correspond to Import's imported (block 45). The Element Import's package is then set to correspond to the Import's container (block 46) and the process ends (bubble 47).

Figure 5:
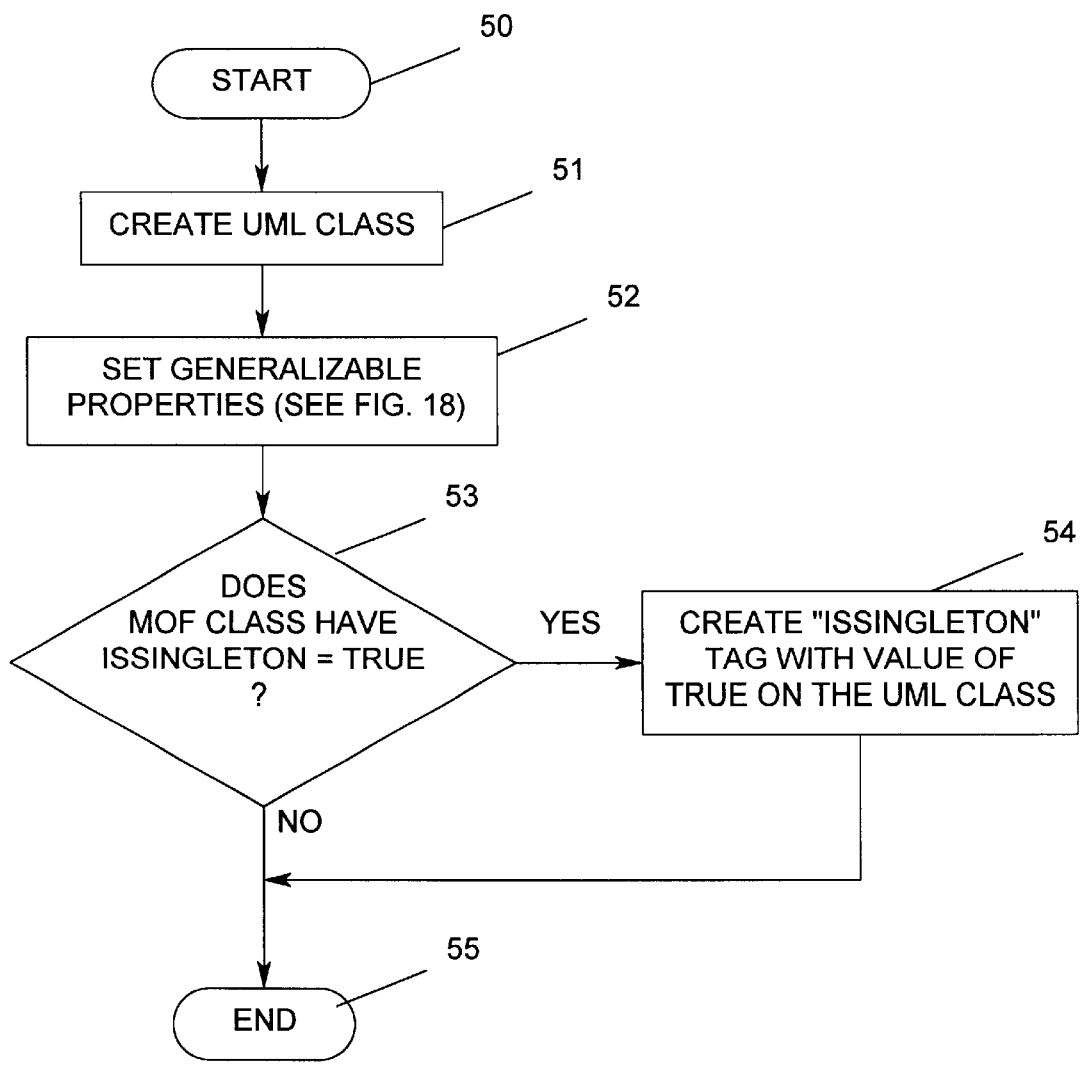
FIG. 5 is a flow chart of the process for translating a MOF Class to a UML Class.

Referring now to FIG. 5, the process for translating a MOF Class to a UML Class is shown. The process begins with a start bubble 50 followed by a step of creating a UML class (block 51). Next, generalizable properties are set (block 52), which step is illustrated in FIG. 18 and amplified hereinbelow. After this, an inquiry is made as to whether or not MOF class has isSingleton=TRUE (diamond 53). If the answer to this inquiry is yes, then an "isSingleton" Tagged Value is created with a value of TRUE on the UML class (block 54). On the other hand, if the answer to the inquiry is no, or upon completion of the step depicted by the block 54, the process ends (bubble 55).

Figure 6A:
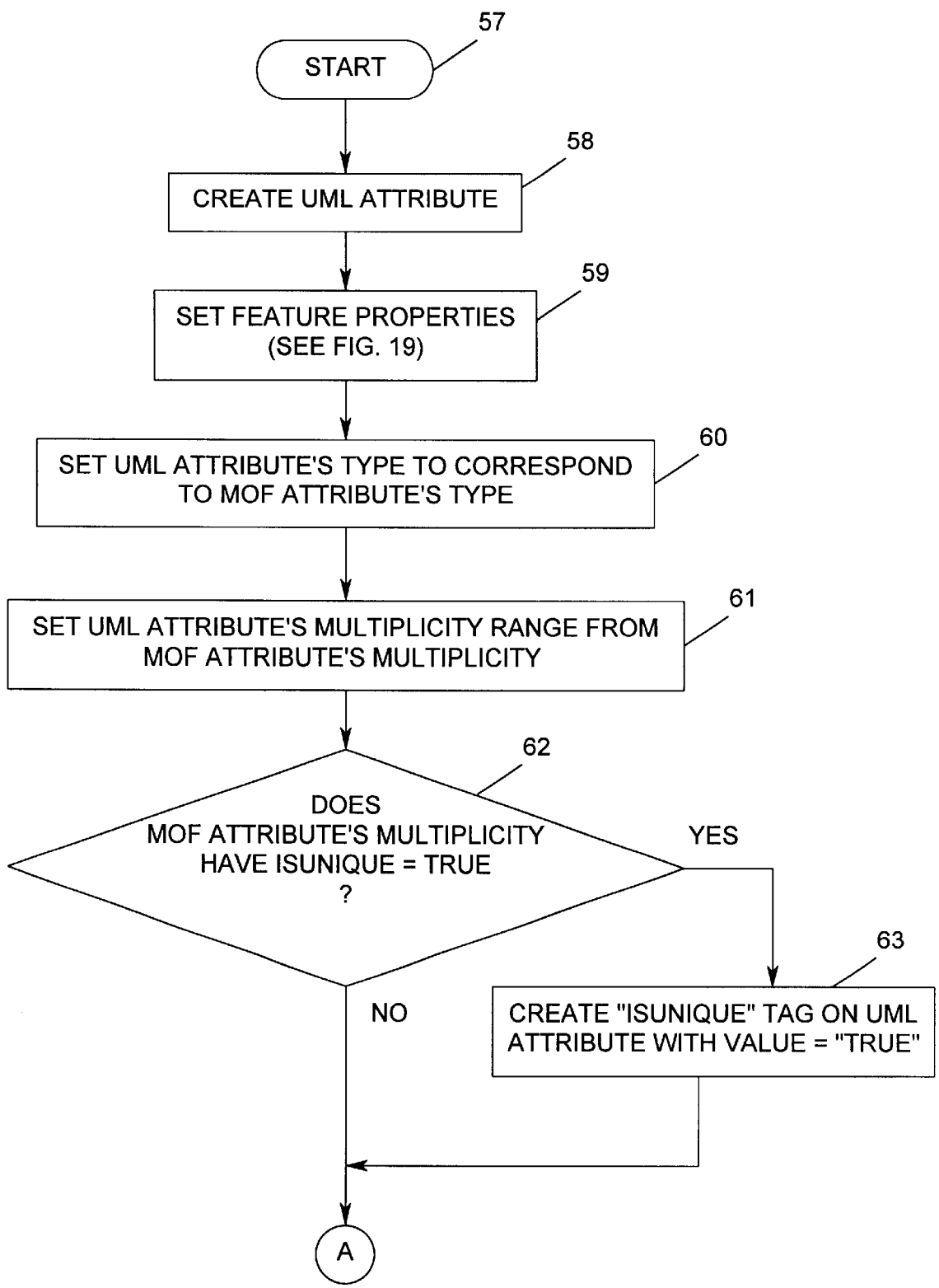
FIGS. 6A and 6B combined form a flow chart of the process for translating a MOF Attribute to a UML Attribute.
Figure 19:
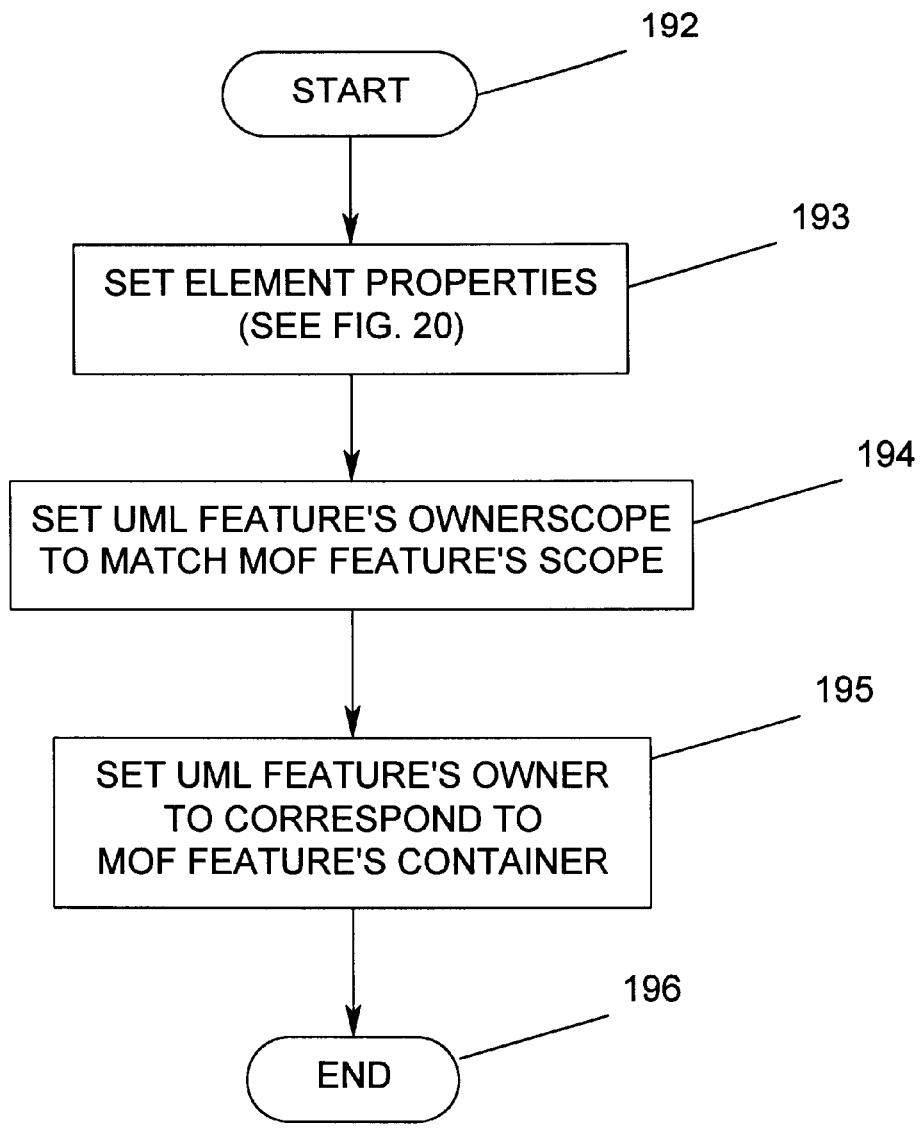
FIG. 19 is a flow chart of the process for setting Feature properties.

Referring now to FIG. 6A, the first of a two-sheet drawing of the process for translating a MOF Attribute to a UML Attribute is shown. The process begins with a start bubble 57 followed by a step of creating a UML Attribute (block 58). Next, Feature properties are set (block 59), which is illustrated in FIG. 19 and will be amplified hereinbelow. After this, UML Attribute's type is set to correspond to MOF Attribute's type (block 60) and UML Attribute's multiplicity range is set from MOF Attribute's multiplicity (block 61). An inquiry is next made as to whether or not MOP Attribute's multiplicity has isUnique=TRUE (diamond 62). If the answer to this inquiry is yes, then an "isUnique" Tagged Value is created on the UML Attribute with a value of TRUE (block 63). On the other hand, if the answer to this inquiry is no, or upon completion of the step depicted by the block 63, a branch is made to FIG. 6B as denoted by a connector A.

Figure 6B:
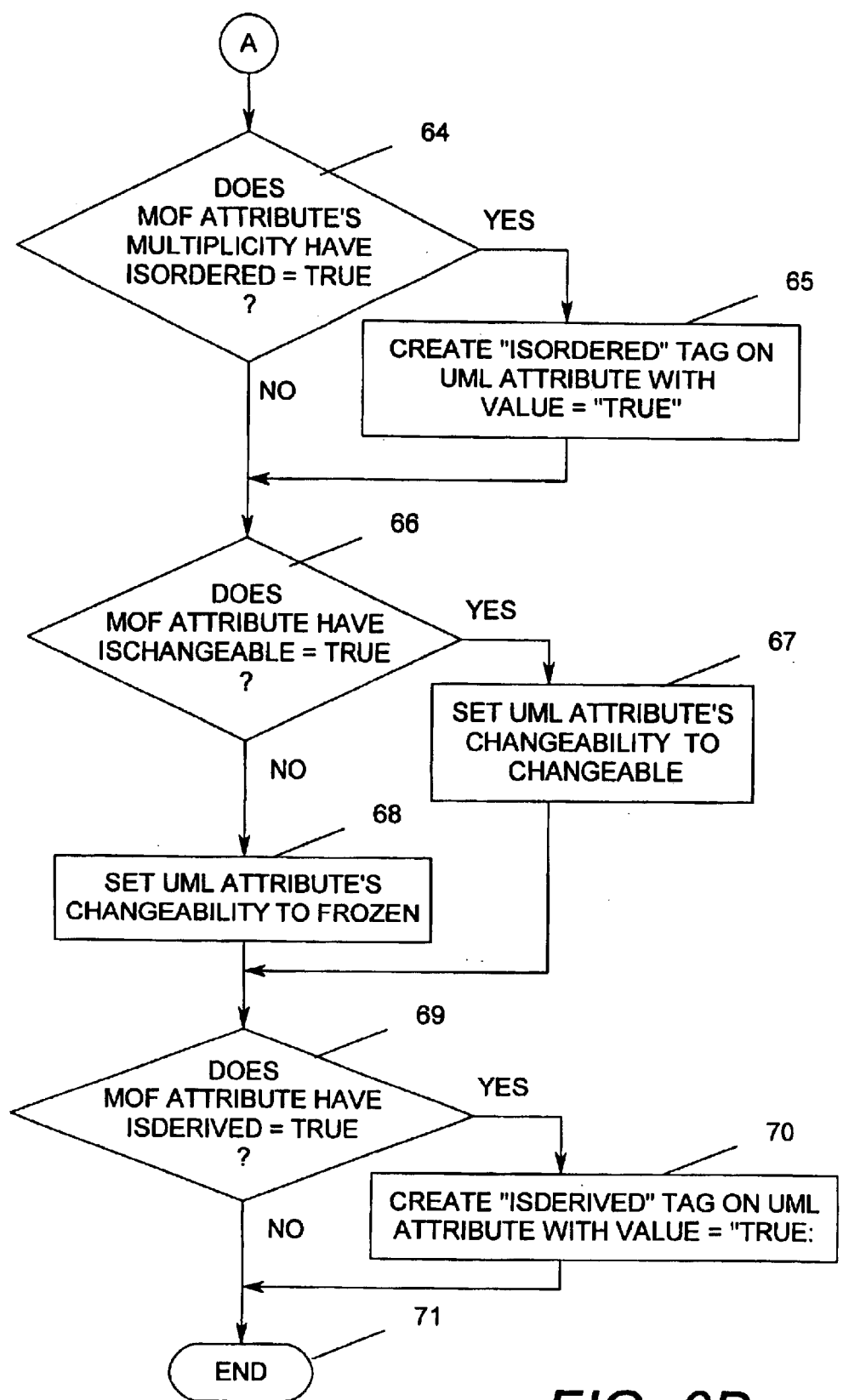

Referring now to FIG. 6B at the connector A, an inquiry is made as to whether or not MOF attribute's multiplicity has isOrdered=TRUE (diamond 64). If the answer to this inquiry is yes, then an "isOrdered" Tagged Value is created on the UML Attribute with a value of TRUE (block 65). On the other hand, if the answer to this inquiry is no, or upon completion of the step depicted by the block 65, another inquiry is made as to whether or not the MOF Attribute has isChangeable=TRUE (diamond 66). If the answer to this inquiry is yes, then the UML Attribute's changeability is set to changeable (block 67). On the other hand, if the answer to the inquiry depicted by the diamond 66 is no, then the UML Attribute's changeability is set to frozen (block 68). Upon completion of this step, or the step depicted by the block 67, yet another inquiry is made as to whether or not the MOF Attribute has isDerived=TRUE (diamond 69). If the answer to this inquiry is yes, then an "isDerived" Tagged Value is created on the UML Attribute with a value of TRUE (block 70). If the answer to the inquiry depicted by the diamond 69 is no, or upon completion of the step depicted by the block 70, the process ends (bubble 71).

Figure 7:
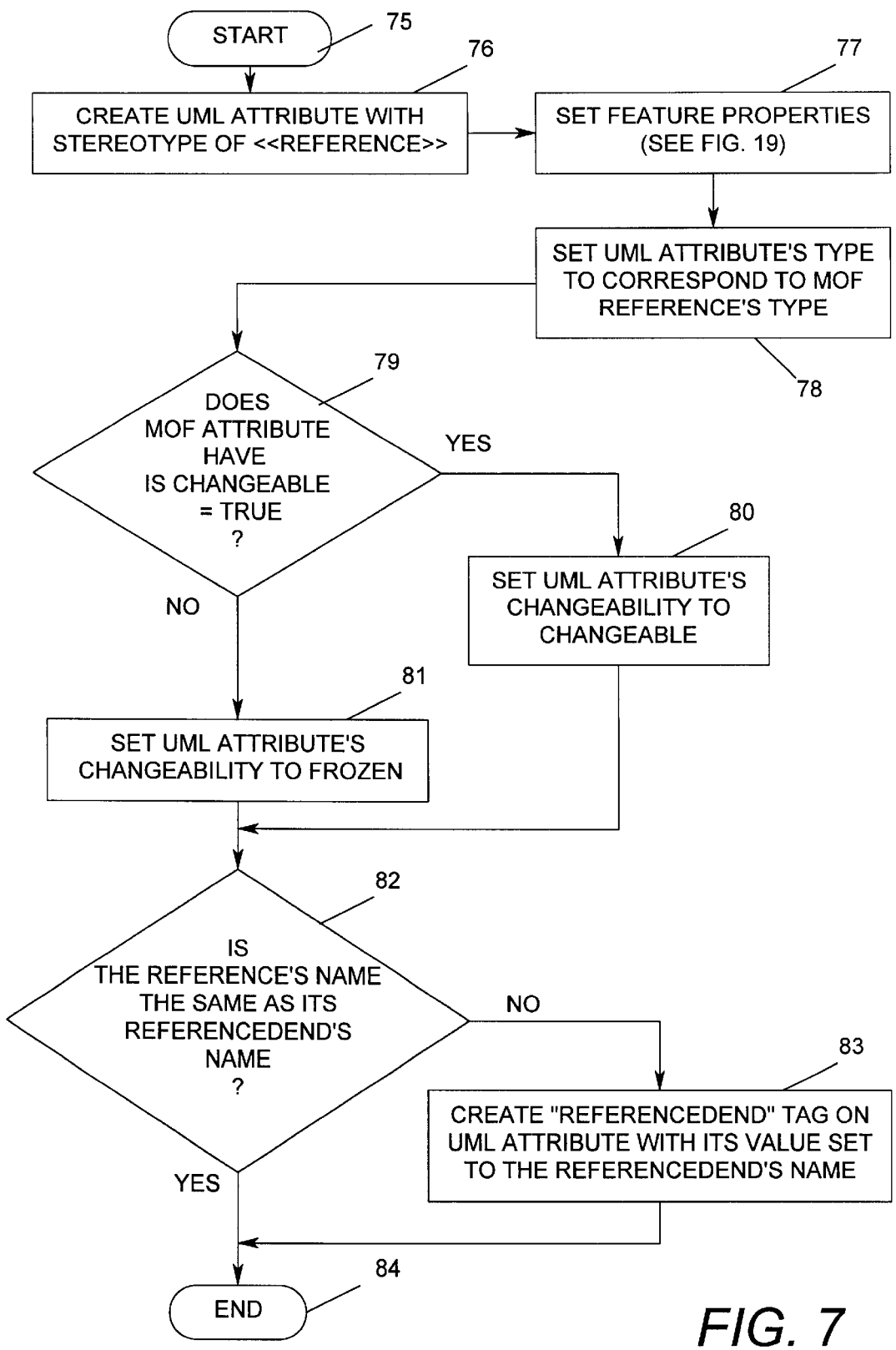
FIG. 7 is a flow chart of the process for translating a MOF Reference into a UML <<reference>> Attribute.

Referring now to FIG. 7, a flow chart of the process for translating a MOF Reference into a UML <<reference>> Attribute is shown. The process begins with a start bubble 75 followed by a step of creating a UML Attribute with stereotype of <<reference>> (block 76). Next, Feature properties are set (block 77), which is illustrated in FIG. 19 and will be amplified hereinbelow. After this, the UML Attribute's type is set to correspond to the MOF Reference's type (block 78). An inquiry is then made as to whether or not the MOF Attribute's ischangeable equals TRUE (diamond 79). If the answer to this inquiry is yes, the UML Attribute's changeability is set to changeable (block 80). On the other hand, if the answer to this inquiry is no, then the UML Attribute's changeability is set to frozen (block 81). Upon completion of the step depicted by the block 80 or block 81, another inquiry is made as to whether or not the Reference's name is the same as its referencedEnd's name (diamond 82). If the answer to this inquiry is no, a "referencedEnd" Tagged Value is created on the UML Attribute with its value set to the referencedEnd's name (block 83). On the other hand, if the answer to this latter inquiry is yes, or upon completion of the step depicted by the block 83, the process ends (bubble 84).

Figure 8:
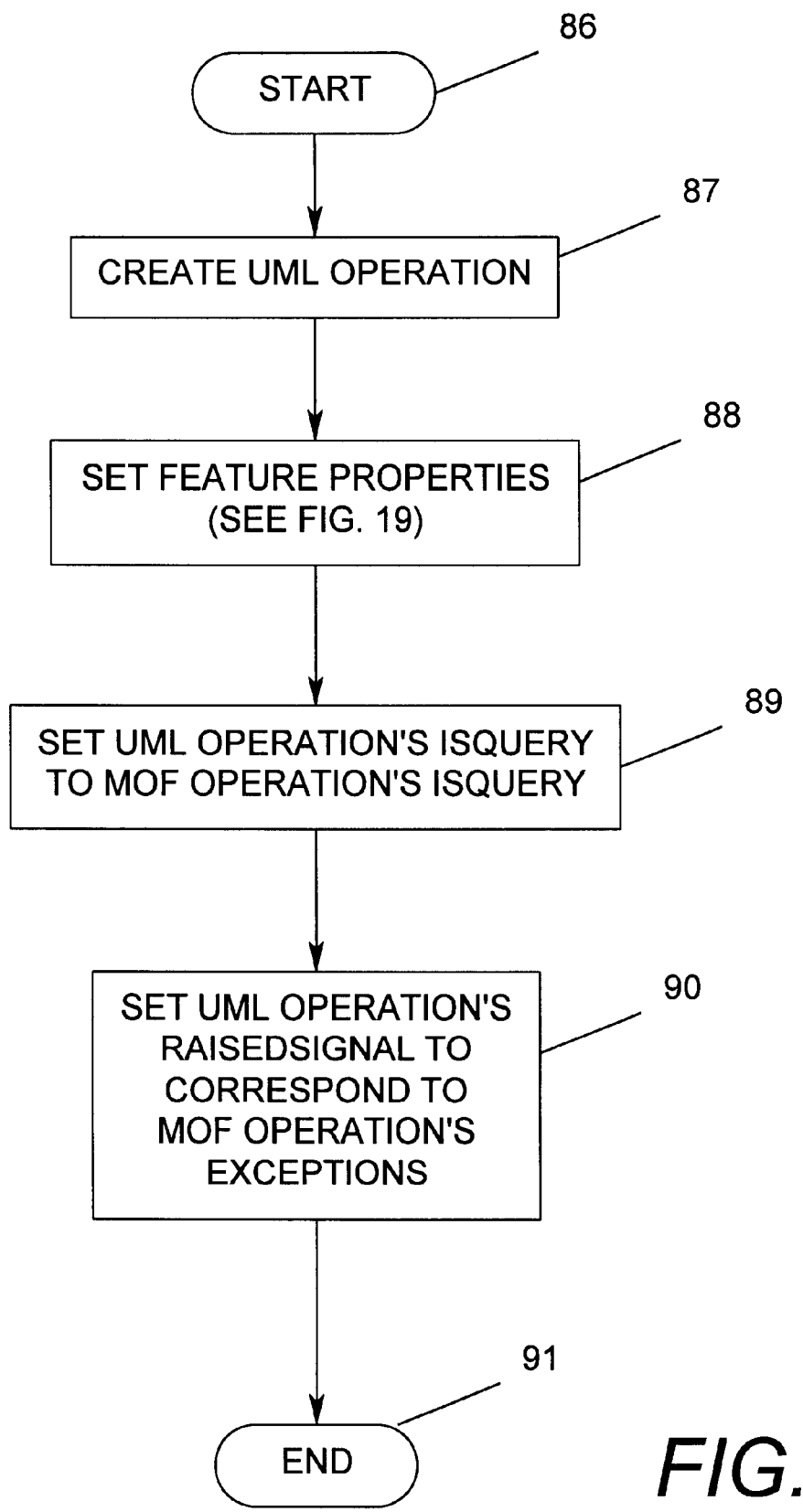
FIG. 8 is a flow chart of the process for translating a MOF Operation into a UML Operation.

Referring now to FIG. 8, a flow chart of the process for translating a MOF Operation into a UML Operation is shown. The process begins with a start bubble 86 followed by a step of creating a UML Operation (block 87). Next, Feature properties are set (block 88), which is illustrated in FIG. 19 and will be amplified hereinbelow. After this, the UML Operation's isQuery is set to the MOF Operation's isQuery (block 89) and the UML Operation's raisedSignal is set to correspond to the MOF Operation's exceptions (block 90); and the process ends (bubble 91).

Figure 9A:
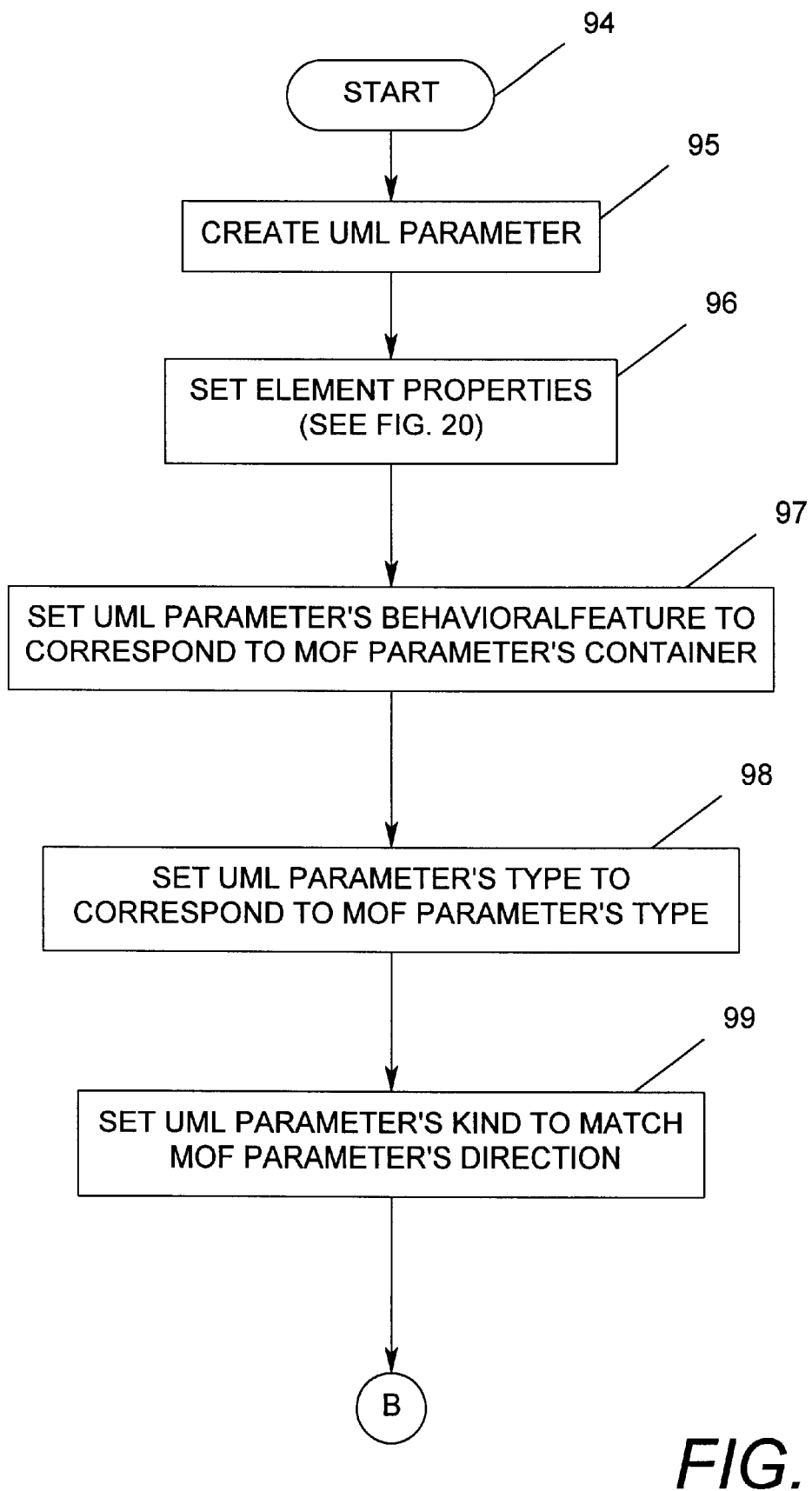
FIGS. 9A and 9B combined form a flow chart of the process for translating a MOF Operation Parameter into a UML Parameter.
Figure 20:
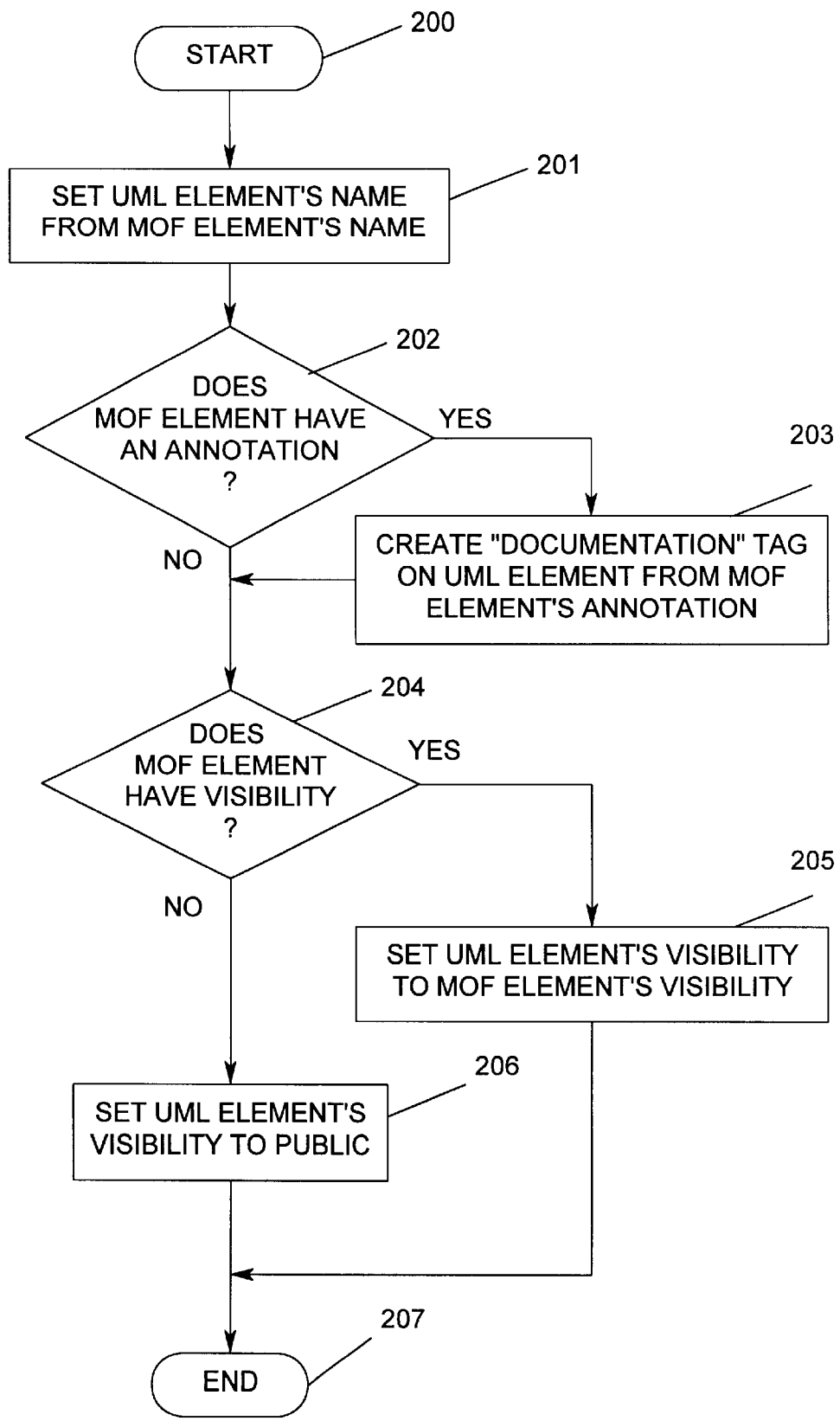
FIG. 20 is a flow chart of the process for setting element properties.

Referring now to FIG. 9A, the first of a two-sheet illustration of the flow chart of the process for translating a MOF Operation's Parameter into a UML Parameter. The process begins with a start bubble 94 followed by a step of creating a UML Parameter (block 95). Next, Element properties are set (block 96), which is illustrated in FIG. 20 and will be amplified hereinbelow. After this, the UML Parameter's behavioralFeature is set to correspond to the MOF Parameter's container (block 97); and, the UML Parameter's type is set to correspond to the MOF Parameter's type (block 98). Then, the UML Parameter's kind is set to match the MOF Parameter's direction (block 99). The process illustration continues in FIG. 9B as denoted by a connector B.

Figure 9B:
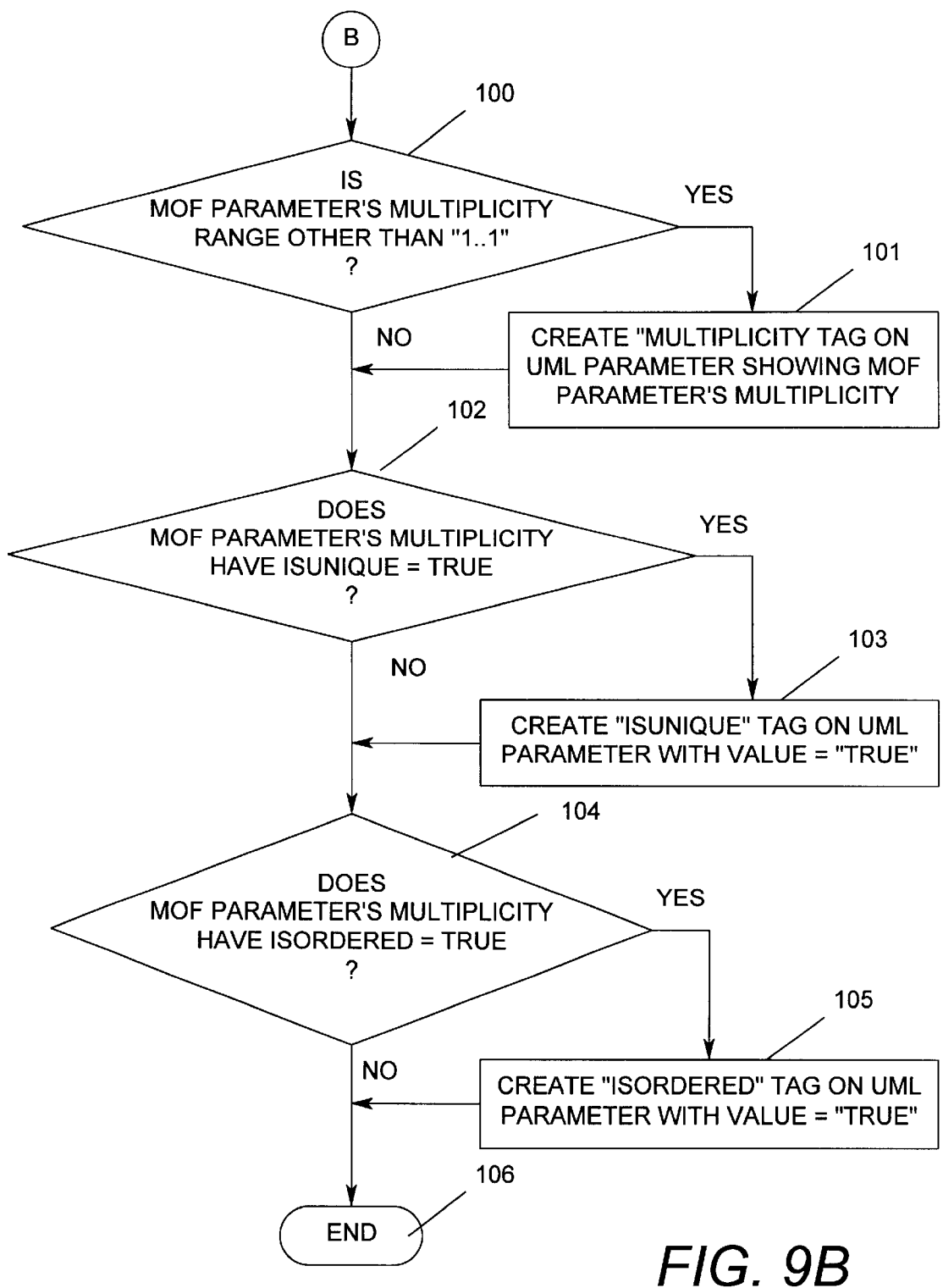

Referring now to FIG. 9B at the connector B, an inquiry is made as to whether or not the MOF Parameter's multiplicity range is other than "1 . . . 1" (diamond 100). If the answer to this inquiry is yes, then a "multiplicity" Tagged Value is created on the UML Parameter showing the MOF Parameter's multiplicity (block 101). On the other hand, if the answer to this inquiry is no, or upon completion of the step depicted by the block 101, another inquiry is made as to whether or not the MOF Parameter's multiplicity has isUnique set to TRUE (diamond 102). If the answer to this inquiry is yes, then an "isUnique" Tagged Value is created on the UML -Parameter with a value of TRUE (block 103). On the other hand, if the answer to this inquiry is no, or upon completion of the step depicted by the block 103, yet another inquiry is made as to whether not the MOF Parameter's multiplicity has isordered set equal to TRUE (diamond 104). If the answer to this inquiry is yes, then an "isordered" Tagged Value is created on the UML Parameter with a value of TRUE (block 105). On the other hand, if the answer to this latter inquiry is no, or upon completion of the step depicted by the block 105, the process ends (bubble 106).

Figure 10:
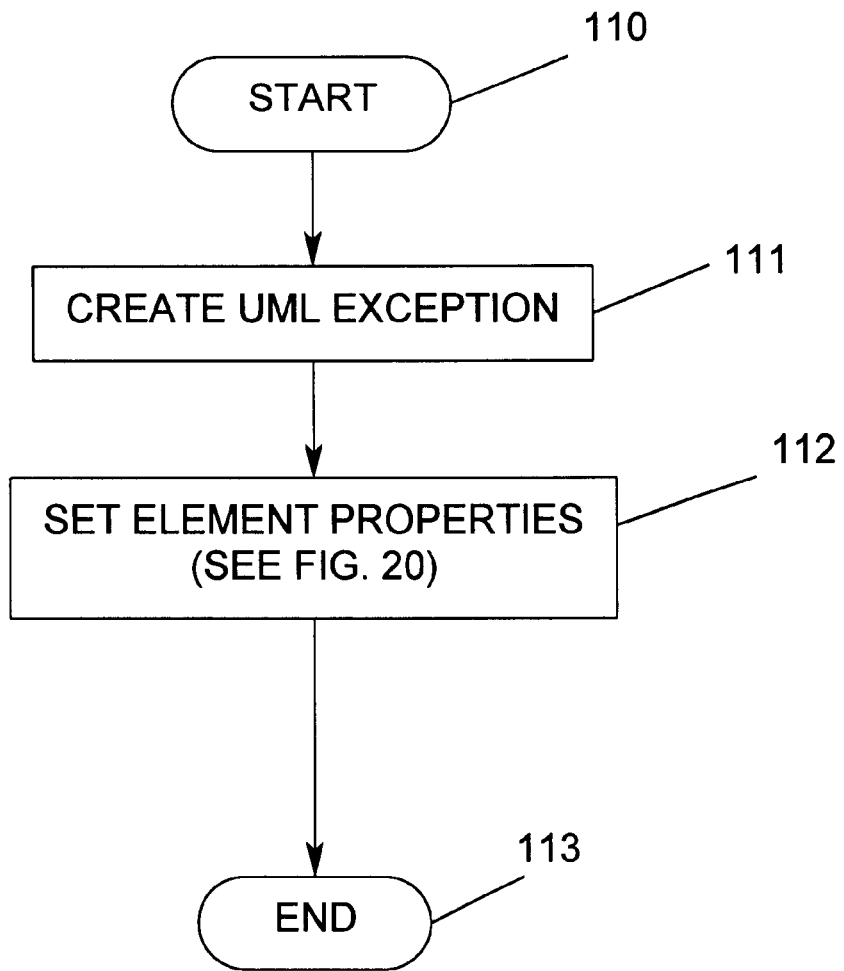
FIG. 10 is a flow chart of the process for translating a MOF Exception to a UML Exception.

Referring now to FIG. 10, the process for translating a MOF Exception to a UML Exception is shown the process begins with a start bubble 110 followed by a step of creating a UML Exception (block 111). Next, the Element properties are set (block 112), which is illustrated in FIG. 20 and further amplified hereinbelow. After this the process ends (bubble 113).

Figure 11:
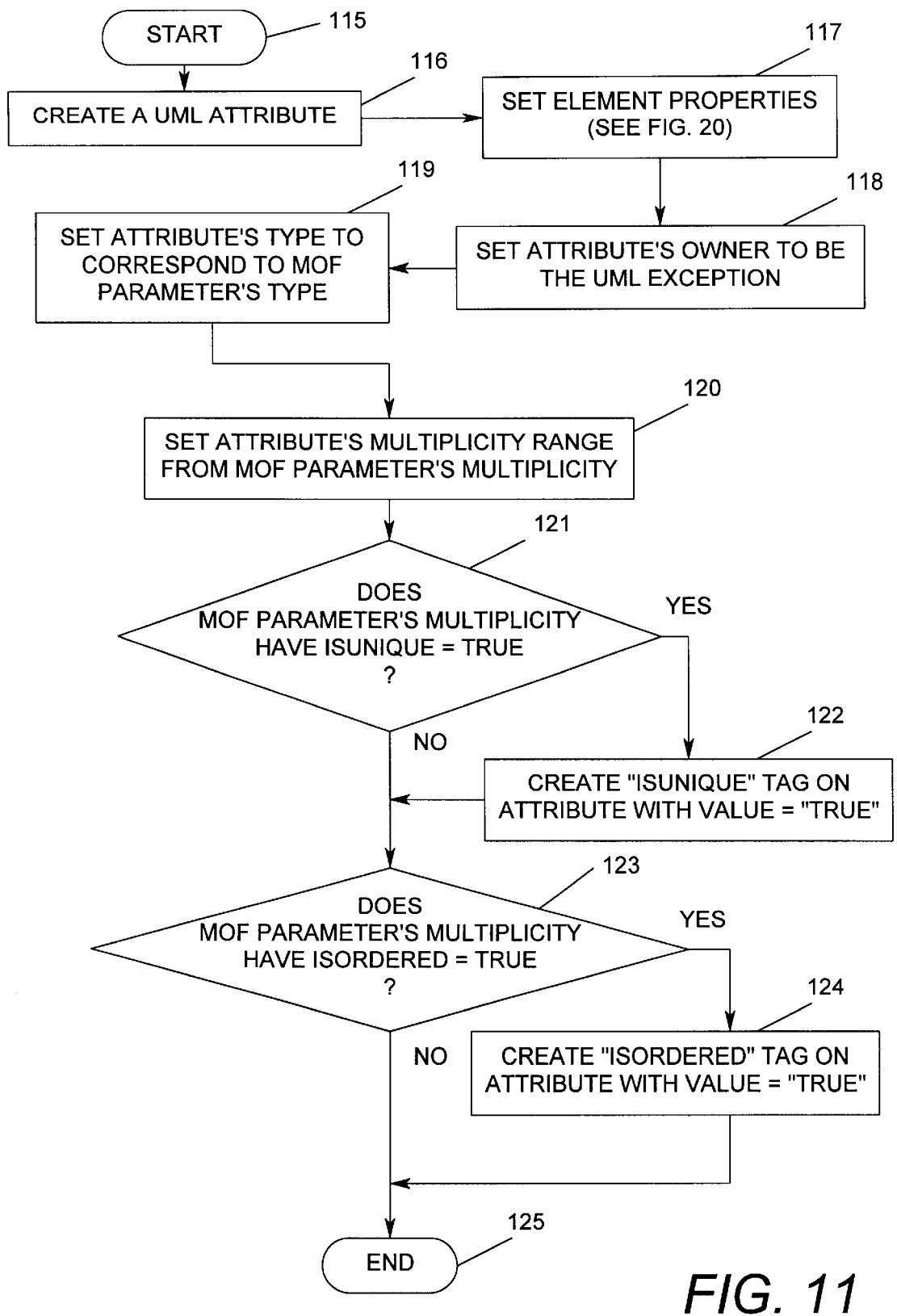
FIG. 11 is a flow chart of the process for translating a MOF Exception's Parameter to a UML Attribute.

Referring now to FIG. 11, a flow chart of the process for translating a MOF Exception's Parameter to a UML Exception's Attribute is shown. The process begins with a start bubble 115, followed by a step of creating a UML Attribute (block 116). Next, the Element properties are set (block 117), which is illustrated in FIG. 20 and will be amplified hereinbelow. After this, the Attribute's owner is set to be the UML Exception (block 118); and, the Attribute's type is set to correspond to the MOF Parameter's type (block 119). The Attribute's multiplicity range is then set from the MOF Parameter's multiplicity (block 120). An inquiry is next made as to whether or not the MOF Parameter's multiplicity has isUnique set equal to TRUE (diamond 121). If the answer to this inquiry is yes, then an "isUnique" Tagged Value is created on the Attribute with a value of TRUE (block 122).

If the answer to the inquiry depicted by the diamond 121 is no, or upon completion of the step depicted by the block 122, another inquiry is made as to whether or not the MOF Parameter's multiplicity has isOrdered set equal to TRUE (diamond 123). If the answer to this inquiry is yes, then an "isOrdered" Tagged Value is crated on the Attribute with a value equal to TRUE (block 124). On the other hand, if the answer to this latter inquiry is no, or upon completion of the step depicted by the block 124, the process ends (bubble 125).

Figure 12:
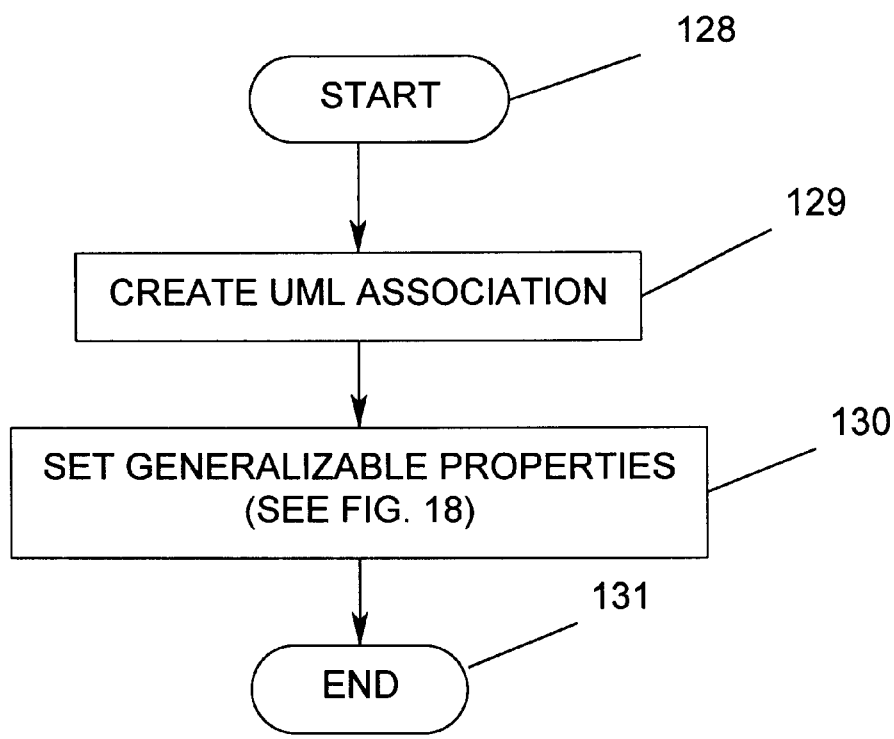
FIG. 12 is a flow chart of the process for translating a MOF Association to a UML Association.

Referring now to FIG. 12, the flow chart of the process of translating a MOF Association to a UML Association is shown. The process begins with a start bubble 128 followed by a step of creating a UML Association (block 129). Next, generalizable properties are set (block 130), which is illustrated in FIG. 18 and will be amplified hereinbelow. After this the process ends (bubble 131).

Figure 13A:
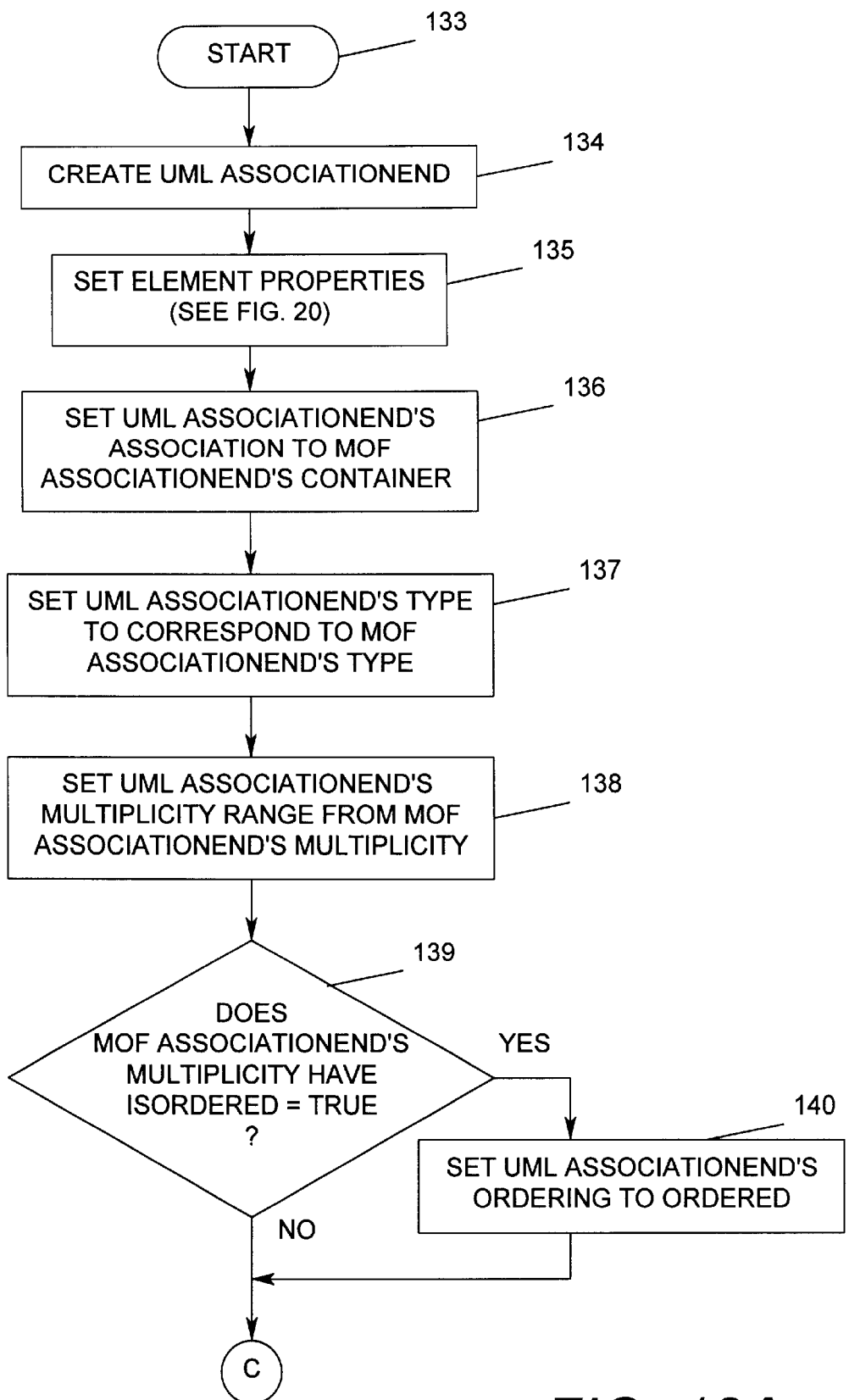
FIGS. 13A and 13B combined form a flow chart of the process for translating a MOF Association End to a UML Association.

Referring now to FIG. 13A, the first sheet of a two-sheet flow chart of the process for translating a MOF Association End to a UML Association End is shown. The process begins with a start bubble 133 followed by a step of creating a UML AssociationEnd (block 134). Next, Element properties are set (block 135), which is illustrated in FIG. 20 and will be amplified hereinbelow. After this, the UML Association End's association is set to MOF Association End's container (block 136); and, the UML Association End's type is set to correspond to the MOF Association End's type (block 137). The UML Association End's multiplicity range is then set from the MOF Association End's multiplicity (block 138). An inquiry is next made as to whether or not the MOF Association End's multiplicity has isOrdered set equal to TRUE (diamond 139). If the answer to this inquiry is yes, then the UML Association End's ordering is set to ordered (block 140). On the other hand, if the answer to the inquiry depicted by the diamond 139 is no, or upon completion of the step depicted by the block 140, the process illustration continues in FIG. 13B as denoted by a connector C.

Figure 13B:
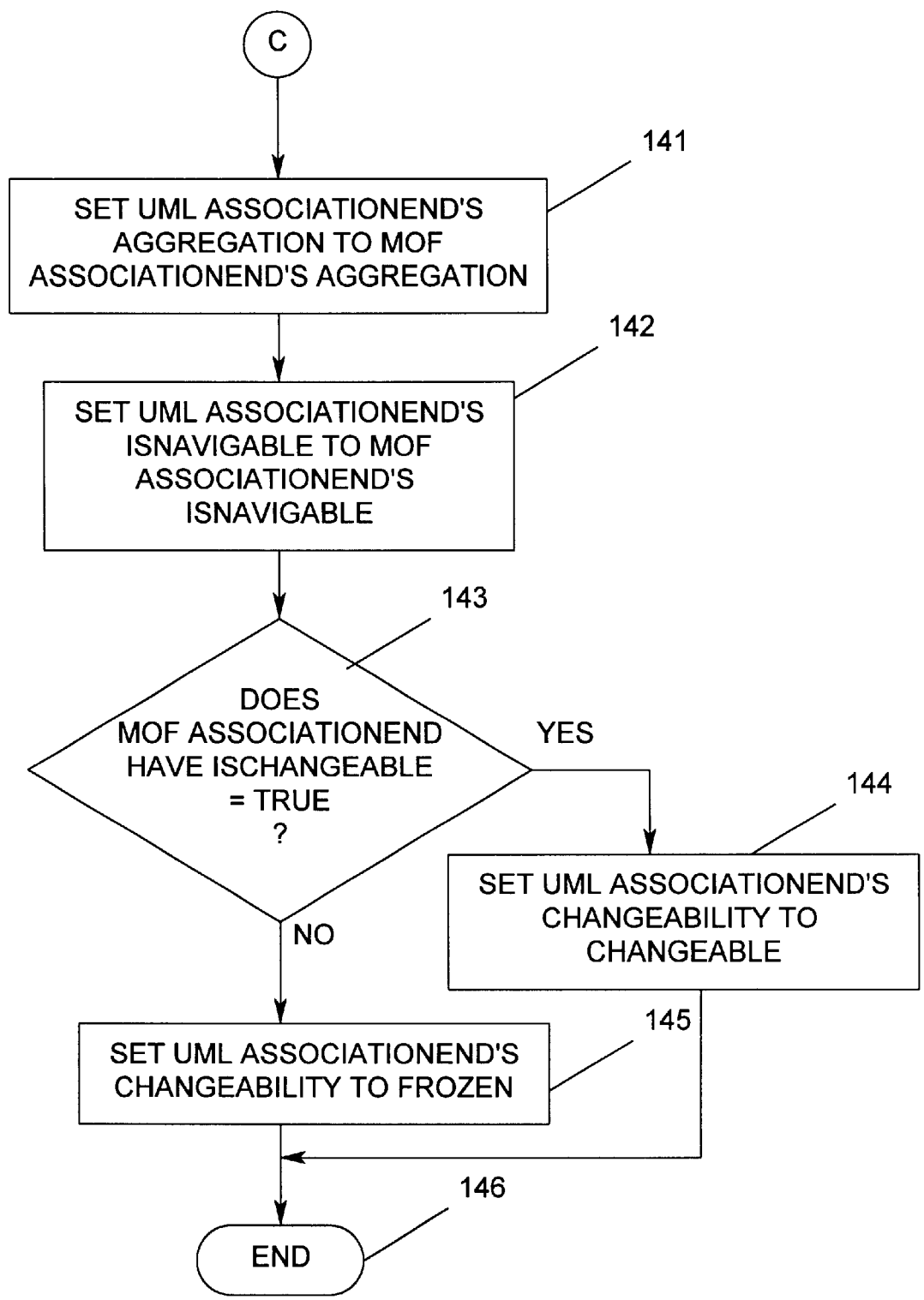

Referring now to FIG. 13B at the connector C, the UML Association End's aggregation is set to the MOF Association End's aggregation (block 141). Next, the UML Association End's isNavigable is set to the MOF Association End's isNavigable (block 142). After this, an inquiry is made as to whether or not the MOF Association End has ischangeable set equal to TRUE (diamond 143). If the answer to this inquiry is yes, then the UML Association End's changeability is set to changeable (block 144). On the other hand, if the answer to this inquiry is no, then the UML Association End's changeability is set to frozen (block 145). Upon completion of the step depicted by the block 144 or the block 145 the process ends (bubble 146).

Figure 14:
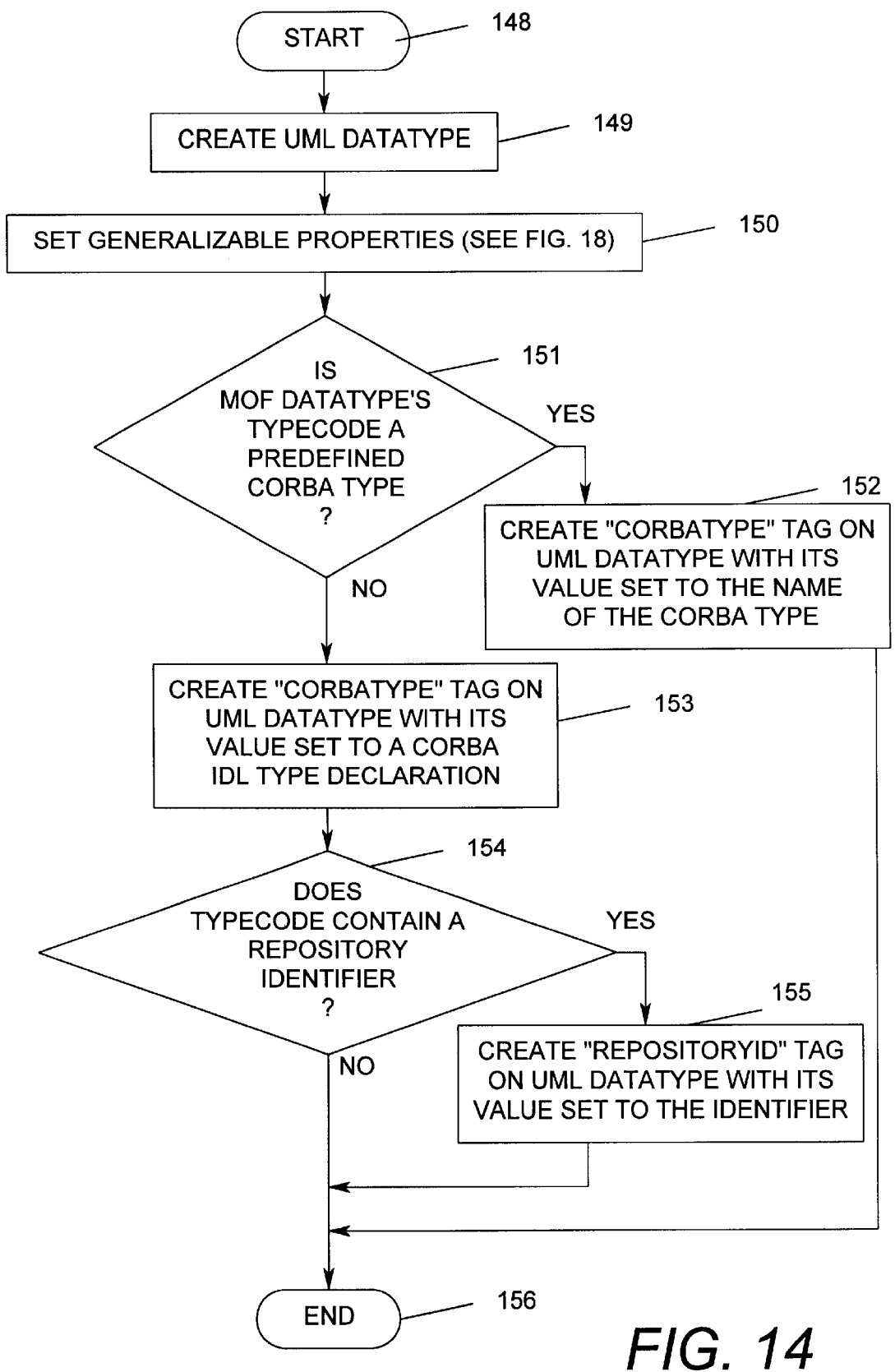
FIG. 14 is a flow chart of the process for translating a MOF Data Type to a UML Data Type.

Referring now to FIG. 14, a flow chart of the process for translating a MOF Data Type to a UML Data Type is shown. The process begins with a start bubble 148 followed by a step of creating a UML Data Type (block 149). Next, the generalizable properties are set (block 150), which is illustrated in FIG. 20 and will be amplified hereinbelow. After this, an inquiry is made as to whether or not the MOF Datatype's typeCode is a predefined CORBA type (diamond 151). If the answer to this inquiry is yes, then a "corbaType" Tagged Value is created on the UML Data Type with its value set to the name of the CORBA type (block 152).

If the answer to the inquiry depicted by the diamond 151 is no, then a "corbaType" Tagged Value is created on the UML Data type with its value set to a CORBA IDL type declaration (block 153). Next, another inquiry is made as to whether or not typecode contains a repository identifier (diamond 154). If the answer to this inquiry is yes, then a "repositoryId" Tagged Value is created on the UML Data Type with its value set to the identifier (block 155). Upon completion of the step depicted by the block 152 or the block 155, or if the answer to the inquiry depicted by the diamond 154 is no, the process ends (bubble 156).

Figure 15:
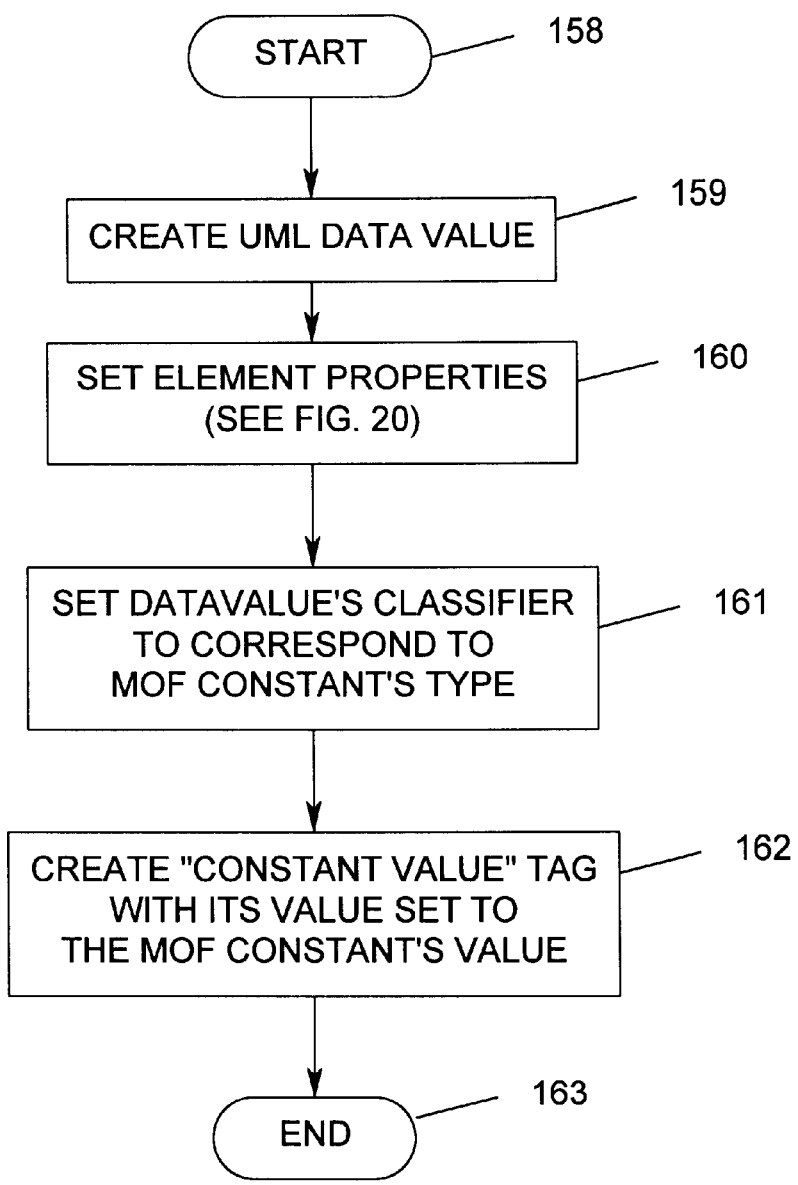
FIG. 15 is a flow chart of the process for translating a MOF Constant to a UML Data Value.
Figure 16:
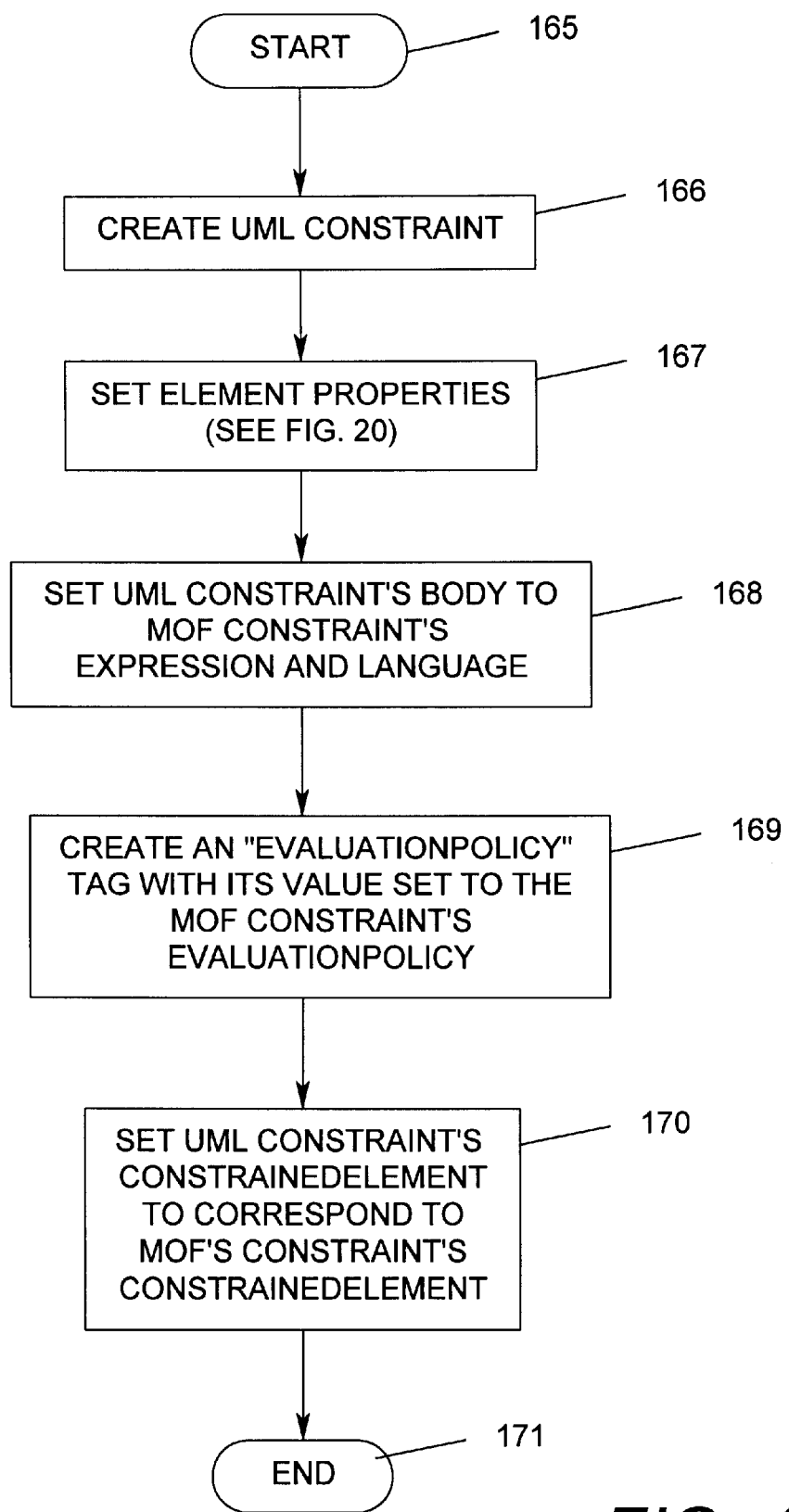
FIG. 16 is a flow chart of the process for translating a MOF Constraint to a UML Constraint.

Referring now to FIG. 15, a flow chart of the process for translating a MOF Constant to a UML Data Value is shown. The process begins with a start bubble 158 followed by a step of creating a UML Data Value (block 159). The Element properties are then set (block 160), which is illustrated in FIG. 20 and will be amplified hereinbelow. Next, the Data Value's classifier is set to correspond to the MOF Constant's type (block 161); and, a "constantvalue" Tagged Value is created with its value set to the MOF Constant's value (block 162). Finally, the process ends (bubble 163).

Referring now to 16, a flow chart of the process for translating a MOF Constraint to a UML Constraint is shown. The process begins with a start bubble 165 followed by a step of creating a UML Constraint (block 166). Next, the Element properties are set (block 167), which is illustrated in FIG. 20 and will be amplified hereinbelow. After this, the UML Constraint's body is set to the MOF Constraint's expression and language (block 168); and, an "evaluationpolicy" Tagged Value is created with its value set to the MOF Constraint's evaluationpolicy (either "immediate" or "deferred") (block 169). The UML Constraint's constrainedElement is then set to correspond to the MOF's Constraint's constrainedElement (block 170) and the process ends (bubble 171).

Figure 17:
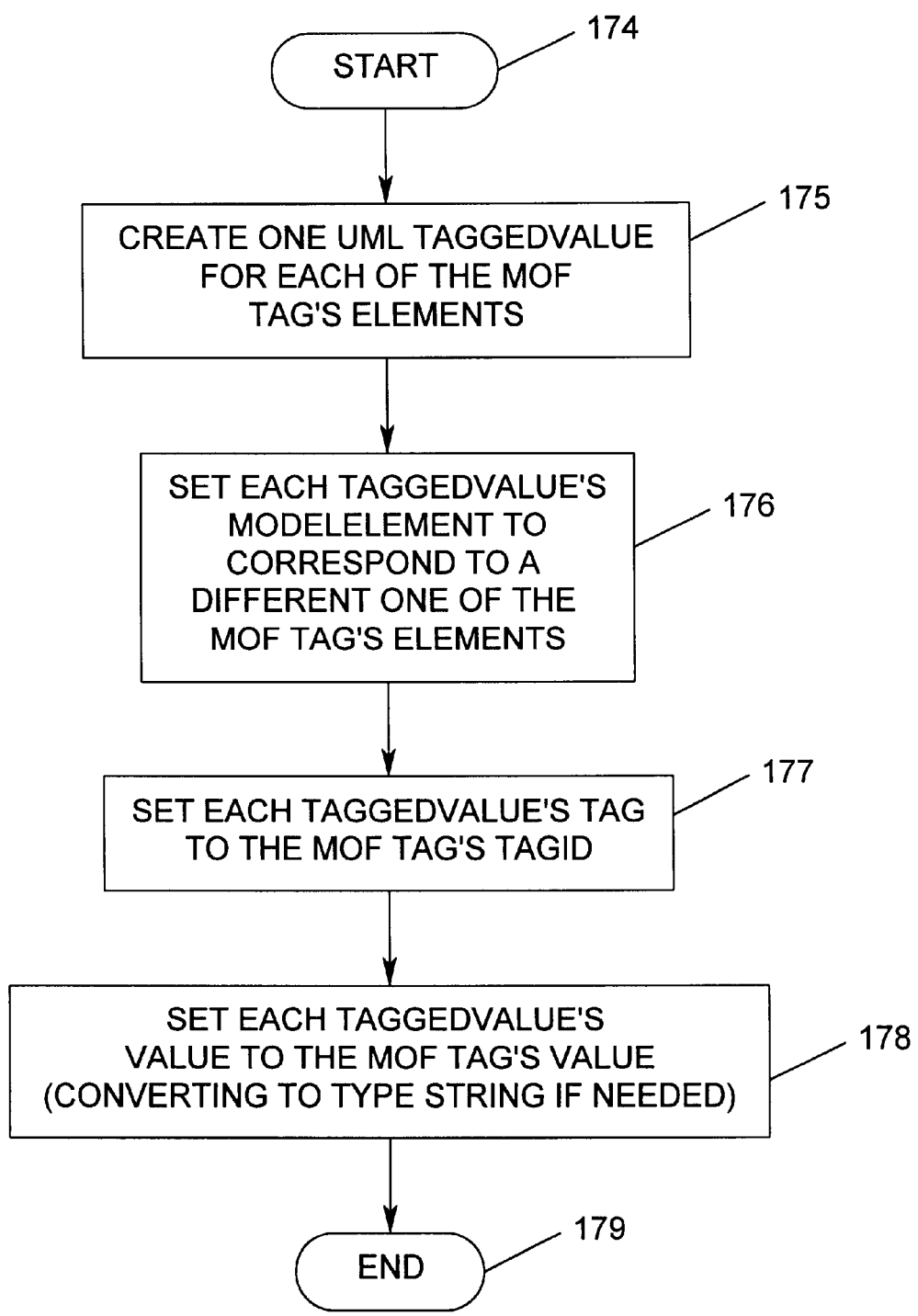
FIG. 17 is a flow chart of the process for translating a MOF Tag to a UML Tagged Value.

Referring now to FIG. 17, a flow chart of the process for translating a MOF Tag to a UML Tagged Value is shown. The process begins with a start bubble 174 followed by a step of creating one UML Tagged Value for each of the MOF Tag's elements (block 175). Next, each Tagged Value's modelElement is set to correspond to a different one of the MOF Tag's elements (block 176). After this, each Tagged Value's tag is set to the MOF Tag's tagId (block 177). Each Tagged Value's value is set to the MOF Tag's value (converting to type string if needed) (block 178) and the process ends (bubble 179).

Referring now to FIG. 18, the flow chart of the process for setting generalizable properties is shown. The process begins with a start bubble 182 followed by a step of setting element properties, which is illustrated in FIG. 20 and will be amplified hereinbelow. Next, the UML element's isAbstract, isRoot, and isLeaf are set from the MOF element (block 184). After this, an inquiry is made as to whether or not the MOF element has supertypes (diamond 185). If the answer to this inquiry is yes, then a UML generalization is created for each MOF supertype (block 186). Each UML generalization is next made for each MOF supertype (block 186; and, each UML generalization is made an ownedElement of the containing UML model (block 187). On the other hand, if the answer to the inquiry depicted by the diamond 185 is no, or upon completion of the step depicted by the block 187, the UML element's namespace is set to correspond to the MOF element's container (block 188) and the process ends (bubble 189).

Referring now to FIG. 19, a flow chart of the process for setting Feature properties is shown. The process begins with a start bubble 192 followed by a step of setting element properties (block 193), which is illustrated in FIG. 20 and will be amplified hereinbelow. Next, the UML Feature's ownerScope is set to match the MOP Feature's scope (block 194); and, the UML feature's owner is set to correspond to the MOF feature's container (block 195); after which the process ends (bubble 196).

Referring now to FIG. 20, a flow chart of the process for setting element properties is shown. The process begins with a start bubble 200 followed by a step of setting the UML element's name from the MOF element's name (block 201). Next, an inquiry is made as to whether or not the MOF element has an annotation (diamond 202). If the answer to this inquiry is yes, then a "documentation" Tagged Value is created on the UML element with the MOF element's annotation as its value (block 203). On the other hand, if the answer to this inquiry is no, or upon completion of the step depicted by the block 203, another inquiry is made as to whether or not the MOF element has a visibility attribute (diamond 204). If the answer to this inquiry is yes, then the UML element's visibility is set to the MOF element's visibility (block 205). On the other hand, if the answer to this latter inquiry is no, then the UML element's visibility is set to public (block 206). Upon completion of the step depicted by the block 205 or the block 206, the process ends (bubble 207).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A computer-implemented method for automatically translating a Metaobject Facility (MOF) metamodel into a Unified Modeling Language (UML) Model such that the UML model provides a graphical picture of the MOF metamodel, said MOF metamodel including element types that are not supported by UML, said method comprising the steps of:
   a. providing a respective translation process for translating each type of MOF element into a corresponding UML representation, wherein Tagged Values in the UML are used to contain MOF information not directly supported by UML,
   b. reading each element of a MOF metamodel;
   c. determining the type of each MOF element read in the preceding step;
   d. selecting a translation process for the type determined in the preceding step; said translation process including the steps of:
      (d1) setting said UML element's name from said MOF element's name;
      (d2) where said MOF element has an annotation, creating a "documentation" Tagged Value on said UML element with the MOF annotation as its value;
      (d3) where said MOF element has a visibility attribute, setting said UML element's visibility to said MOF element's visibility; and,
      (d4) where said MOF element has no visibility attribute, setting said UML element's visibility to public; and
   e. executing the process selected in the preceding step.

2. The method as in claim 1 where said step of selecting a translation process, wherein said MOF Element is a Generalizable Element, selects a process which performs the steps of:
   f. setting said UML element's attributes from said MOF element;
   g. for each supertype of said MOF element creating a UML Generalization; and,
   h. setting said UML element's namespace to correspond to said MOF element's container.

3. The method as in claim 2 wherein said step of setting attributes further includes the step of setting said UML element's isAbstract, isRoot, and isLeaf from said MOF element.

4. The method as in claim 2 wherein said step of creating a UML Generalization further includes the step of making said UML Generalization an ownedElement within the encompassing UML Model.

5. The method as in claim 1 where said translation process for translating each MOF Feature to a UML Feature further includes the steps of:
   f. setting said UML Feature's ownerScope to match said MOF Feature's scope; and,
   g. setting said UML Feature's owner to correspond to said MOF Feature's container.

6. The method as in claim 1 where said step of selecting a translation process, wherein said MOF Element is a MOF Package, selects a process which performs the steps of:
   p. creating said UML Model with a stereotype of <<metamodel>>;
   q. if said MOF Package contains clusteredImport, creating a "clusteredImport" Tagged Value on said UML Model naming each clustered Import; and,
   r. creating a "hasImplicitReferences" Tagged Value on said UML Model with a value of "false".

7. The method as in claim 1 where said step of selecting a translation process, wherein said MOF Element is a MOF Import, selects a process which performs the steps of:
   f. creating a UML ElementImport;
   g. determining if said MOF Import's name is the same as Imported Element's name, and if not;
   h. setting said ElementImport's name to Import's name;
   i. setting ElementImport's visibility to Import's visibility;
   j. setting ElementImport's importedElement to correspond to Import's imported; and,
   k. setting ElementImport's Package to correspond to Import's container.

8. The method as in claim 1 where said step of selecting a translation process, wherein said MOF Element is a MOF Class, selects a process which performs the steps of:
   f. creating a UML Class;
   g. determining if MOF Class has isSingleton set to TRUE, and if so; and,
   h. creating isSingleton tag with a value of TRUE on said UML Class.

9. The method as in claim 1 where said step of selecting a translation process, wherein said MOF Element is a MOF Attribute, selects a process which performs the steps of:
   f. creating a UML Attribute;
   g. setting said UML Attribute's Type to correspond to said MOF Attribute's Type;
   h. setting said UML Attribute's Multiplicity from said MOF Attribute's Multiplicity;
   i. determining if said MOF Attribute's Multiplicity has isUnique set equal to TRUE, and if yes;
   j. creating an isUnique tag on said UML Attribute with a value of TRUE;
   k. determining if said MOF Attribute's Multiplicity has isOrdered set to TRUE, and if yes;
   l. creating an isOrdered tag on said UML Attribute with a value of TRUE;
   m. determining if said MOF Attribute has ischangeable set to TRUE, and if so;
   n. setting said UML Attribute's changeability to changeable;
   o. if said MOF Attribute does not have ischangeable set to TRUE, setting said UML Attribute's changeability to FROZEN;
   p. determining if said MOF Attribute has isDerived set equal to TRUE, and if so;
   q. creating an isDerived tag on said UML Attribute with a value of TRUE.

10. The method as in claim 1 where said step of electing a translation process, wherein said MOF Element is a MOF Reference, selects a process which performs the steps of:
   f. creating a UML Attribute with stereotype of <<reference>>;
   g. setting Type of said UML Attribute to correspond to Type of said MOF Reference;
   h. determining if said MOF Attribute has ischangeable set to TRUE, and if so;
   i. setting said changeability of said UML Attribute to CHANGEABLE;
   j. if said MOF Attribute does not have ischangeable set to TRUE, setting changeability of said UML Attribute to FROZEN; and,
   k. determining if name of said MOF Reference is the same as the name of its referencedEnd, and if not, creating a referencedEnd tag on said UML Attribute with its value set to the name of said referencedEnd.

11. The method as in claim 1 where said step of selecting a translation process, wherein said MOF Element is a MOF Operation, selects a process which performs the steps of:
   f. creating a UML Operation;
   g. setting isQuery of said UML Operation to isQuery of said MOF Operation; and,
   h. setting raisedSignal of said UML Operation to correspond to Exceptions of said MOF Operation.

12. The method as in claim 1 where said step of selecting a translation process, wherein said MOF Element is a MOF Operation's Parameter, selects a process which performs the steps of:
   f. creating a UML Parameter;
   g. setting behavioralFeature of said UML Parameter to correspond to Container of said MOF Parameter;
   h. setting Type of said UML Parameter to correspond to Type of said MOF Parameter;
   i. setting kind of said UML Parameter to match direction of said MOF Parameter;
   j. determining if Multiplicity of said MOF Parameter is in a range other than "1 . . . 1", and if so;
   k. creating a Multiplicity tag on said UML Parameter showing Multiplicity of said MOF Parameter;
   l. determining if Multiplicity of said MOF Parameter has isUnique set to TRUE, and if so;
   m. creating an isUnique tag on said UML Parameter with a value of TRUE;
   n. determining if Multiplicity of said MOF Parameter has isOrdered set to TRUE, and if so;
   o. creating an isOrdered tag on said UML Parameter with a value of TRUE.

13. The method as in claim 1 where said step of selecting a translation process, wherein said MOF Element is a MOF Exception, selects a process which performs the step of creating a UML Exception.

14. The method as in claim 1 where said step of selecting a translation process, wherein said MOF Element is a MOF Exception's Parameter, selects a process which performs the steps of:
   f. creating a UML Attribute;
   g. setting owner of said UML Attribute to be the UML Exception;
   h. setting type of said UML Attribute to correspond to type of said MOF Parameter;
   i. setting Multiplicity Range of said UML Attribute to Multiplicity of said MOF Parameter;
   j. determining if Multiplicity of said MOF Parameter has isUnique set to TRUE, and if so;
   k. creating an isUnique tag on said UML Attribute with a value of TRUE;
   l. determining if Multiplicity of said MOF Parameter has isordered set to TRUE, and if so;
   m. creating an isordered tag on said UML Attribute with a value of TRUE.

15. The method as in claim 1 where said step of selecting a translation process, wherein said MOF Element is a MOF Association, selects a process which performs the step of creating a UML Association.

16. The method as in claim 1 where said step of selecting a translation process, wherein said MOF Element is a MOF Association End, selects a process which performs the steps of:
   f. creating a UML Association End;
   g. setting association of said UML Association End to container of said MOF Association End;
   h. setting type of said UML Association End to correspond to type of said MOF Association End;
   i. setting Multiplicity Range of said UML Association End from Multiplicity of said MOF Association End;
   j. determining if Multiplicity of said MOF Association End has isordered set to TRUE, and if so;
   k. setting Ordering of said UML Association End to Ordered;
   l. setting Aggregation of said UML Association End to Aggregation of said MOF Association End;
   m. setting isNavigable of said UML Association End to isNavigable of said MOF Association End;
   n. determining if MOF Association End has ischangeable set to TRUE, and if so;
   o. setting changeability of said UML Association End to CHANGEABLE; and
   p. if said MOF Association End does not have ischangeable set to TRUE, then setting changeability of said UML Association End to FROZEN.

17. The method as in claim 1 where said step of selecting a translation process, wherein said MOF Element is a MOF Data Type, selects a process which performs the steps of:
  f. creating a UML Data Type;
  g. determining if Type Code of said MOF Data Type is a predefined CORBA Type, and if so;
  h. creating CORBA Type tag on said UML Data Type with its value set to the name of the CORBA Type, and ending said process;
  i. if said Type Code of said MOF Data Type is not a predefined CORBA Type, then creating a CORBA Type tag on said UML Data Type with its value set to a CORBA IDL Type Declaration;
  j. determining if said Type Code contains a repository Identifier, and if so;
  k. creating a repository Id tag on said UML Data Type with its value set to said Identifier.

18. The method as in claim 1 where said step of selecting a translation process, wherein said MOF Element is a MOF Constant, selects a process which performs the steps of:
  f. creating a UML Data Value;
  g. setting classifier of said UML Data Value to correspond to type of said MOF Constant; and,
  h. creating a constant value tag with its value set to the value of said MOF Constant.

19. The method as in claim 1 where said step of selecting a translation process, wherein said MOF Element is a MOF Constraint, selects a process which performs the steps of:
  f. creating a UML Constraint;
  g. setting body of UML Constraint to expression and language of said MOF Constraint;
  h. creating an evaluation policy tag with its value set to evaluation policy of said MOF Constraint; and,
  i. setting constrained element of said UML Constraint to correspond to constrained element of said MOF Constraint.

20. The method as in claim 1 where said step of selecting a translation process, wherein said MOF Element is a MOF Tag, selects a process which performs the steps of:
  f. creating one UML Tagged Value for each element of said MOF Tag;
  g. setting model element of each of said Tagged Values to correspond to a different one of the elements of said MOF Tag;
  h. setting tag of each of said Tagged Value to a tagID of each of said MOF Tags; and,
  i. setting a value for each of said Tagged Values to the value of said MOF Tag.

21. A computer-implemented method for translating a Metaobject Facility (MOF) metamodel into a Unified Modeling Language (UML) Model, said method comprising the steps of:
  a. reading each element of said MOF metamodel;
  b. determining the type of each MOF element read in the preceding step;
  c. selecting a translation process for the type determined in the preceding step; wherein the process selected when said MOF Element is a MOF package, performs the steps of:
    (c1) creating said UML Model with a stereotype of <<metamodel>>;
    (c2) if said MOF Package contains clusteredImport, creating a "clusteredImport" Tagged Value on said UML Model naming each clustered Import; and,
    (c3) creating a "hasImplicitReferences" Tagged Value on said UML Model with value of "false"; and
  d. executing the process selected in the preceding step.

22. A computer-implemented method for translating a Metaobject Facility (MOF) metamodel into a Unified Modeling Language (UML) Model, said method comprising the steps of:
  a. reading each element of said MOF metamodel;
  b. determining the type of each MOF element read in the preceding step;
  c. selecting a translation process for the type determined in the preceding step; wherein the process selected when said MOF Element is a MOF DATA TYPE performs the steps of:
    (c1) creating a UML Data Type
    (c2) determining if Type Code of said MOF Data Type is a predefined CORBA Type, and if so;
    (c3) creating CORBA Type tag on said UML Data Type with its value set to the name of the CORBA Type, and ending said process;
    (c4) if said Type Code of said MOF Data Type is not a predefined CORBA Type, then creating a CORBA Type tag on said UML Data Type with its value set to a CORBA IDL Type Declaration;
    (c5) determining if said Type Code contains a repository Identifier, and if so;
    (c6) creating a repository Id tag on said UML Data Type with its value set to said Identifier; and
  d. executing the process selected in the preceding step.

* * * * *